US010292338B2

(12) United States Patent
Haughton et al.

(10) Patent No.: US 10,292,338 B2
(45) Date of Patent: May 21, 2019

(54) VERTICAL CULTIVATION SYSTEM, COMPONENTS THEREOF, AND METHODS FOR USING SAME

(71) Applicant: Organized Thought LLC, Steamboat Springs, CO (US)

(72) Inventors: Francis Haughton, Steamboat Springs, CO (US); Lyndsey Haughton, Steamboat Springs, CO (US); David Kerstetter, Hamilton, MT (US)

(73) Assignee: Organized Thought LLC, Steamboat Springs, CO (US)

( * ) Notice: Subject to any disclaimer, the term of this patent is extended or adjusted under 35 U.S.C. 154(b) by 0 days.

(21) Appl. No.: 15/614,098

(22) Filed: Jun. 5, 2017

(65) Prior Publication Data

US 2017/0354099 A1 Dec. 14, 2017

Related U.S. Application Data

(60) Provisional application No. 62/347,343, filed on Jun. 8, 2016.

(51) Int. Cl.
| | |
|---|---|
| *F21V 23/00* | (2015.01) |
| *A01G 7/04* | (2006.01) |
| *F21V 29/83* | (2015.01) |
| *A01G 9/02* | (2018.01) |
| *F21V 7/00* | (2006.01) |
| *F21Y 105/00* | (2016.01) |
| *F21Y 103/10* | (2016.01) |
| *F21Y 115/10* | (2016.01) |
| *F21Y 107/90* | (2016.01) |

(52) U.S. Cl.
CPC ............. *A01G 7/045* (2013.01); *A01G 9/022* (2013.01); *F21V 7/005* (2013.01); *F21V 29/83* (2015.01); *F21Y 2103/10* (2016.08); *F21Y 2105/00* (2013.01); *F21Y 2107/90* (2016.08); *F21Y 2115/10* (2016.08); *Y02P 60/146* (2015.11)

(58) Field of Classification Search
CPC . A01G 7/045; A01G 9/12; A01G 9/20; A01G 9/025; A01G 9/022; A01G 31/06; F21V 21/14; F21V 29/83; F21V 7/00; F21V 7/005; Y02P 60/146; F21Y 2105/00; F21Y 2107/90
USPC ......................................................... 362/235
See application file for complete search history.

(56) References Cited

U.S. PATENT DOCUMENTS

| | | | | |
|---|---|---|---|---|
| 3,944,309 | A * | 3/1976 | Taniwaki | A47B 53/02 104/287 |
| 5,416,680 | A * | 5/1995 | Holmes | F21S 8/08 362/265 |
| 9,618,178 | B1 * | 4/2017 | Chappell | F21V 3/02 |

(Continued)

*Primary Examiner* — Claude J Brown
(74) *Attorney, Agent, or Firm* — Mei & Mark LLP

(57) ABSTRACT

A light wall for cultivating at least one plant indoors may be provided. The light wall may include a first side, a second side, a top side, a bottom side, a front side, and a back side. The light wall may further include a first lighting structure unit disposed within sides of the light wall, and may include a first set of mechanical devices configured to enable movement of the light wall. The first lighting structure may be configured to provide light to the at least one plant through at least the first side. The first set of mechanical devices may be configured to enable movement at least along an axis substantially perpendicular to the first side.

20 Claims, 28 Drawing Sheets

(56) References Cited

U.S. PATENT DOCUMENTS

| | | | | |
|---|---|---|---|---|
| 2004/0175290 A1* | 9/2004 | Scheir | A23L 3/28 |
| | | | 422/24 |
| 2012/0104977 A1* | 5/2012 | McKenzie | A01G 7/045 |
| | | | 315/312 |
| 2013/0335962 A1* | 12/2013 | Wu | F21V 5/004 |
| | | | 362/235 |
| 2014/0000162 A1* | 1/2014 | Blank | A01G 31/06 |
| | | | 47/62 A |
| 2014/0144079 A1* | 5/2014 | Lin | A01G 31/06 |
| | | | 47/62 R |
| 2015/0351329 A1* | 12/2015 | Heidl | A01G 9/023 |
| | | | 211/49.1 |
| 2016/0353671 A1* | 12/2016 | Shaughnessy | H05B 33/00 |
| 2017/0079216 A1* | 3/2017 | Quazi | A01G 7/045 |

* cited by examiner

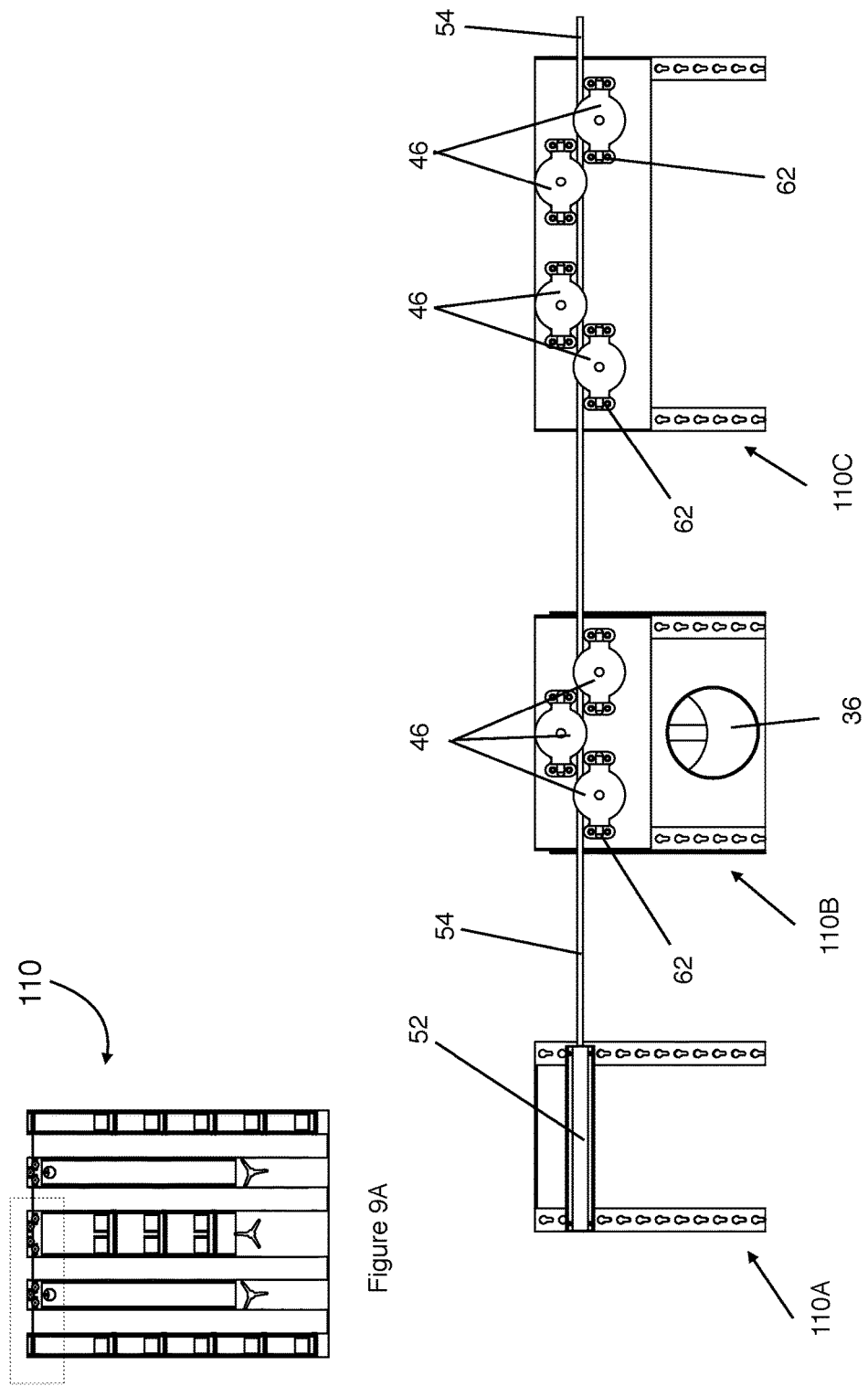

VERTICAL CULTIVATION SYSTEM, COMPONENTS THEREOF, AND METHODS FOR USING SAME

CROSS-REFERENCE TO RELATED APPLICATIONS

This application claims priority to provisional U.S. Patent Application Ser. No. 62/347,343, filed Jun. 8, 2016, the disclosure of which is incorporated by reference herein in its entirety.

TECHNICAL FIELD

The present disclosure is directed to the technical field of agriculture. More particularly, the present disclosure is directed to the technical fields of indoor cultivation and vertical cultivation systems.

BACKGROUND

Cultivating indoors requires providing artificial light in lieu of, or sometimes in addition to, sunlight. In current practice, the use of lamps, which are typically housed in hoods, provide light in a downcast direction. Plants are typically placed in a horizontal pattern on the floor or on a structure in a single layer—e.g., inefficiently using the square footage of the cultivating space. The lamps used in such a horizontal method may lose more then 50% of their efficiency. Placing plants in a horizontal pattern does not maximize the footprint of a growing space. Horizontal cultivation does not provide efficient cost savings to cultivate or harvest crops, especially if there is a shortage in land either indoors or outdoors. Under such circumstances, increased operating expenses with average production rates make commercial cultivation financially difficult.

On the other hand, current vertical cultivation systems may limit the consumers to specific pot sizes, growing techniques, and style of lights. Vertical cultivation systems on the market specifically focus on large quantities of plants of reduced sizes, which does not allow for, or otherwise hinders, the production of larger fruiting plants. Further, such vertical cultivation systems may be insufficiently modular or may provide for insufficient ventilation.

SUMMARY OF THE DISCLOSURE

The present disclosure provides a description of systems and components thereof to address the perceived problems described above and others, as well as methods for using the same.

In one embodiment, a light wall for cultivating at least one plant indoors may be provided. The light wall may include a first side, a second side, a top side, a bottom side, a front side, and a back side. The light wall may further include a first lighting structure unit disposed within sides of the light wall, and may include a first set of mechanical devices configured to enable movement of the light wall. The first lighting structure may be configured to provide light to the at least one plant through at least the first side. The first set of mechanical devices may be configured to enable movement at least along an axis substantially perpendicular to the first side. The first side may have a vertical dimension and a depth dimension, and the front side may have the vertical dimension and a horizontal dimension.

The first set of mechanical devices may include a set of wheels disposed on the bottom side. The set of wheels may be swiveling caster wheels. The set of wheels may be further configured to enable movement at least along an axis substantially perpendicular to the front side.

The first lighting structure unit may include a set of reflectors configured to substantially direct light out of the first side.

The first lighting structure unit may include a set of reflectors configured to direct light out of the first side and the second side.

The light wall may further include a transparent pane disposed along the first side. The light wall may further include a hinge between an edge of the transparent pane and an edge of one of the top side, the bottom side, the front side, and the back side.

The vertical dimension may be within 15% of 4 feet or 6 feet, the depth dimension may be within 15% of 54 inches, and the horizontal dimension may be within 15% of 15 inches.

The first lighting structure unit may include a first light column and a first light source. The first light column may be configured to physically support and provide power to the first light source. The first light column may be disposed along the top side.

The first lighting structure unit may further include a second light column and a second light source. The second light column may be configured to physically support and provide power to the second light source. The first light column may be disposed along the top side. The second light column may be disposed along the bottom side.

The first lighting structure unit may further include a second light source. The first light column may be configured to physically support and provide power to the second light source.

The first lighting structure unit may further include a light mover disposed along the top side. The light mover may be attached to the first light column, and may configured to move at least along an axis substantially perpendicular to the front side.

The light wall may include a second lighting structure unit. It may further include a third lighting structure unit.

The light wall may further include a mobile carriage. The mobile carriage may be disposed at least on the bottom side. The first set of mechanical devices may be disposed on a bottom surface of the mobile carriage.

The first set of mechanical devices may include a first set of trolley wheels. The first set of trolley wheels may be disposed on the front side or the back side. The first set of trolley wheels may be located closer to the top side than the bottom side.

In another embodiment, a light wall for indoor plant cultivation is provided. It may include a first side, a second side, a top side, a bottom side, a front side, and a back side. It may also include a first lighting structure unit disposed within the sides of the light wall. The first lighting structure unit may include a first light column with a first light fixture, a ballast box, and a first reflector. The first light column may be affixed to at least one of the top side, the bottom side, the front side, and the back side. The first light fixture may be configured to receive a light bulb. At least the first side may permit the passage of light.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosure.

FIG. 9B is a detailed view of a portion of the vertical cultivation system depicted in FIG. 8, as identified in FIG. 9A, which is a view of FIG. 8 without detail.

DETAILED DESCRIPTION

Figure 1:
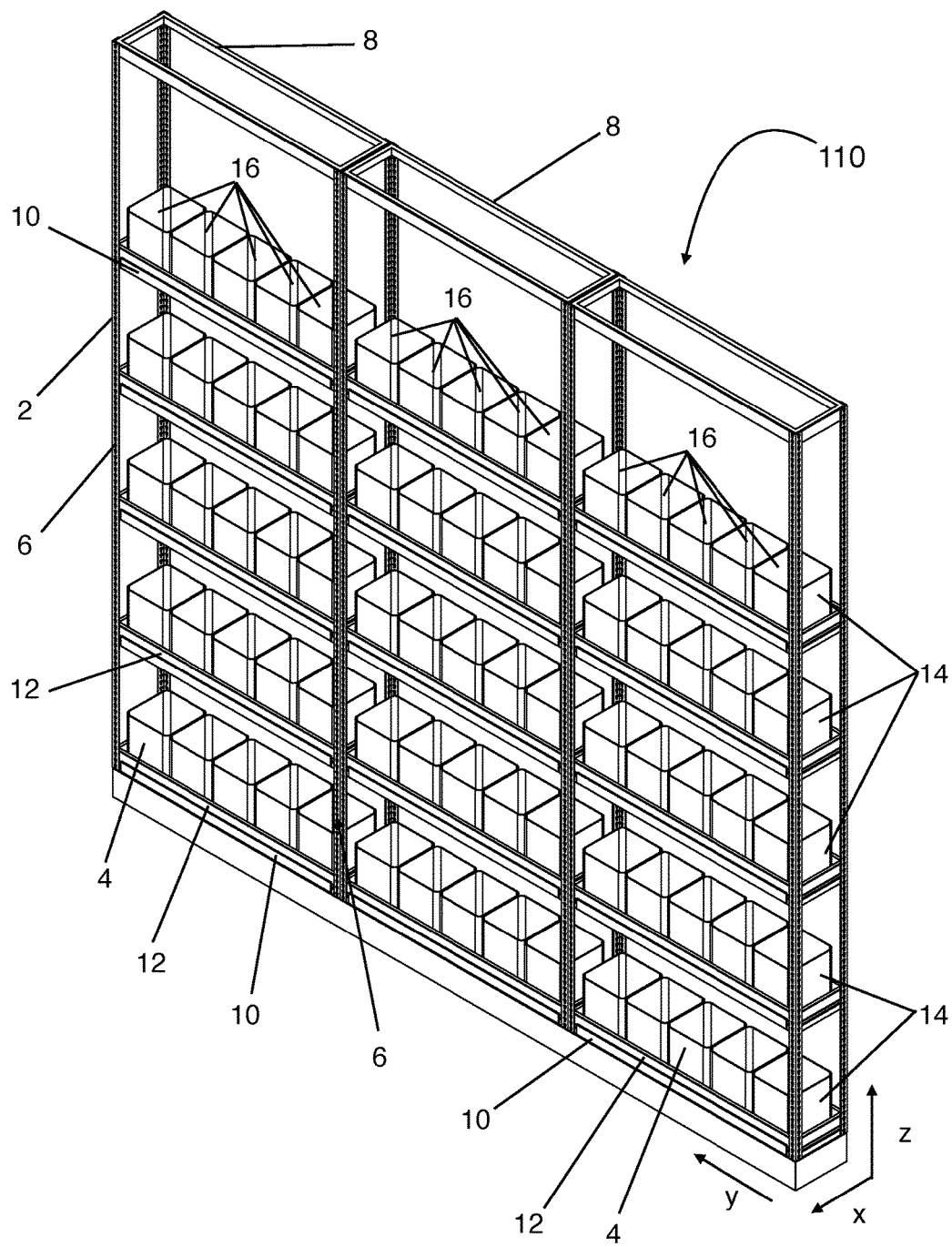
FIG. 1 is a perspective view of a single cultivation wall of a vertical cultivation system according to an embodiment of the present disclosure.

FIG. 1 is a perspective view of a single cultivation wall 110 of a vertical cultivation system 100 according to an embodiment of the present disclosure. Cultivation wall 110 may include rack 2 and a plurality of shelves 10. The shelves 10 may receive plurality of trays 12, which in turn may receive a plurality of storage units 4 for holding and retaining plants or seeds to be cultivated.

Trays 12 may prevent overflow of any liquids that may be applied to the storage units 4 through any type of watering system. It is contemplated that various types watering systems may be used in conjunction with vertical cultivation system 100, for example, drip lines, dutch bucket system, PVC piping, independent hose or any other method to apply water to the storage units 4. In other embodiments, shelves 10 and/or racks 2 may be adapted to hold different types of storage units 4, including pots, cups, hanging baskets, or other growing containers known in the art. In some embodiments, shelves 10 may be permanently or variably angled to, for example, provide more direct exposure to light within the system. As shown, rack 2 and wall 110 may extend in at least vertical (z), horizontal (x), and depth (y) directions. Rack 2 may support a plurality of shelves 10, trays 12, and storage units 4.

Figure 10A:
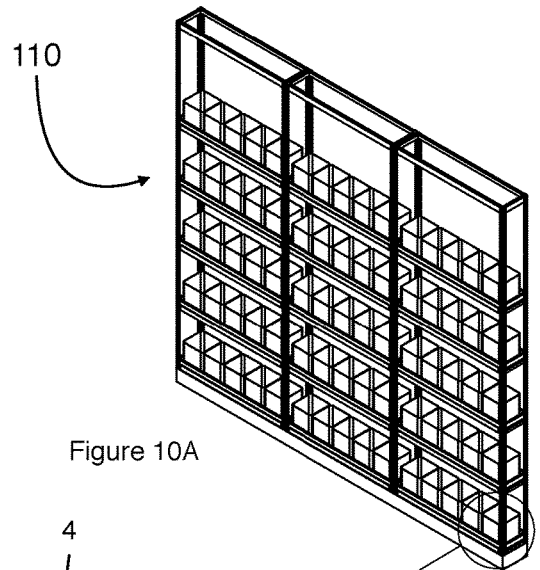
FIG. 10B is a detailed view of a portion of the cultivation wall depicted in FIG. 1, as identified in FIG. 10A, which is a view of FIG. 1 without detail.
Figure 10B:
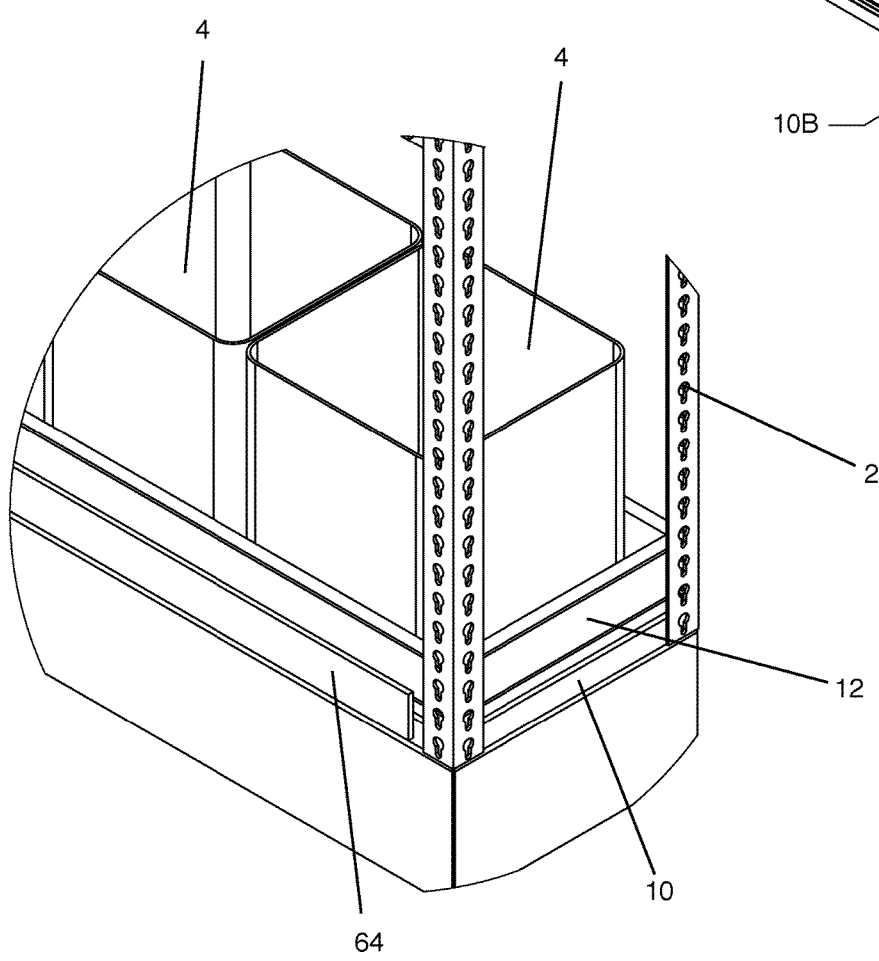

FIGS. 10A and 10B depict perspective and detailed perspective views of a cultivation wall 110 embodiment consistent with FIG. 1. As shown, tray 12 may sit on shelf 10, which is attached to rack 2. Storage unit 4 may sit deep in tray 12 to allow for overflow of water to occur. A protective lip 64 may be provided on shelf 10 to prevent movement of tray 12 or storage units 4.

Referring back to FIG. 1, storage units 4 may be arranged in vertical columns 16 and rows 14, as shown. Rack 2 may further include vertical support members 6 and horizontal support members 8 to provide structural support. Although FIG. 1 depicts an arrangement of five rows 14 (each extending in the depth direction) and fifteen vertical columns 16, it is specifically contemplated that the present disclosure is not limited to such arrangement. Any suitable number of rows and/or columns or any pattern is within the scope of this disclosure. For example, in one embodiment, a cultivation wall 110 may extend in a horizontal direction (x) of 15 inches, a depth direction (y) of 15 feet, and a vertical direction (z) of 13 feet, and may comprise a plurality of shelves 10, trays 12, and storage units 4. The dimensions may be adaptable to a wide variety of uses. For example, the horizontal direction of rack 2 could be as small as 1 inch wide (e.g., if the shelves included hooks upon which hanging baskets may be attached), up to 50 inches for fruiting trees, or anywhere within that range. In certain embodiments, for example, for plants typically cultivated indoors, the horizontal dimension may typically range from 10-24 inches. In some versions, the depth and vertical directions of a rack may range from, for example, 3-30 feet (with 30 feet being a typical warehouse ceiling height). In other embodiments, depth and vertical directions of a rack may range from 3 feet to up to 80 feet tall. There is virtually no limit to the vertical direction z, depth direction y, or horizontal direction x.

The present disclosure is not limited to a rack-type structure for receiving distinct shelves 10, trays 12, and storage units 4. Other cultivation wall embodiments may omit shelves 10, may omit trays 12, and/or omit storage units 4. Yet other cultivation wall embodiments may combine rack 2, shelves 10, trays 12, and/or storage units 4 into combination components. In some embodiments the sides of rack 2 may be permanently or variably angled or curved to increase exposure to light.

Figure 2:
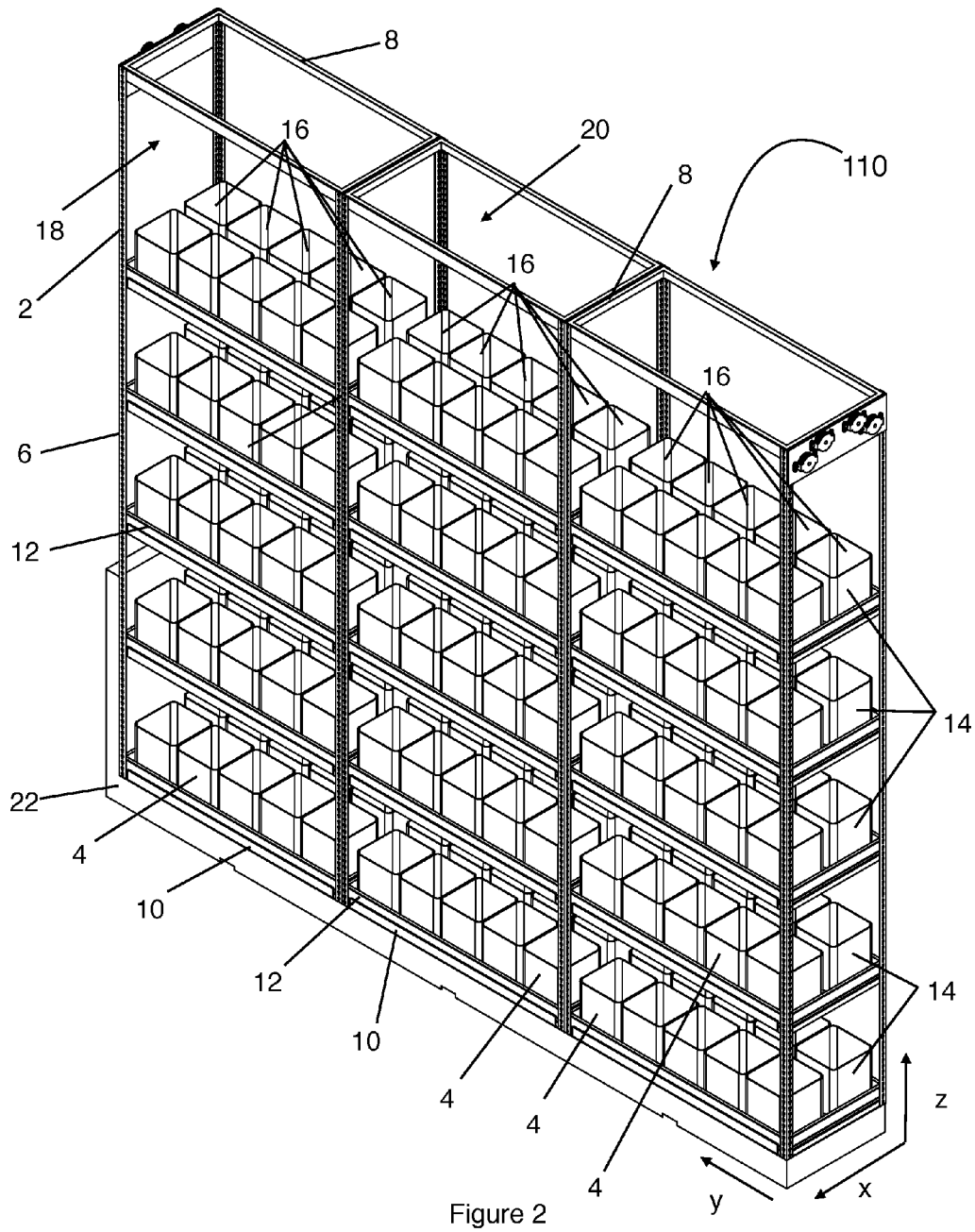
FIG. 2 is a back perspective view of a double cultivation wall of a vertical cultivation system according to an embodiment of the present disclosure.

FIG. 2 is a perspective view of a double cultivation wall 110 of a cultivation system 100 according to an embodiment of the present disclosure. Double cultivation wall 110 may share many aspects with single cultivation wall 110. As with the embodiment of FIG. 1, double cultivation wall 110 may also include rack 2 for receiving a plurality of shelves 10. Shelves 10 may receive a plurality of trays 12, which in turn may receive plurality of storage units 4 for holding and retaining plants. As shown, rack 2 may extend in a vertical (z), horizontal (x), and depth (y) directions and may comprise a plurality of shelves 10, trays 12, and storage units 4.

As shown in FIG. 2, rack 2 of double cultivation wall 110 may have two sides, first side 18 and second side 20 (each shown parallel to they axis). As with the single cultivation wall 110 of FIG. 1, Storage units 4 may be arranged in vertical columns 16 and rows 14, as shown. However, each vertical column 16, row 14 coordinate (e.g., $5^{th}$ column, $2^{nd}$ row) of double cultivation wall may include two storage units 4—a first unit 4 corresponding to first side 18 and a second unit 4 corresponding to second side 20. Alternative embodiments can include any arrangement of columns and/or rows. For example, a rack could include anywhere from one to 30 shelves. Rack 2 may also include vertical support members 6 and horizontal support members 8 to provide structural support.

As further shown in FIG. 2, cultivation wall 110 may include mobile carriage 22. Mobile carriage 22 may provide movement by, for examples, rollers on a track. In alternative embodiments, movement can be provided by one or more mechanical advantages or devices, including, but not limited to, an overhead trolley system, a track provided on the ceiling, a hand push crank, a pneumatic actuator, a pneumatic cylinder, a pneumatic motor, a ball screw, a hydraulic actuator, a hydraulic cylinder, a hydraulic motor, an electric motor, a cart, a dolly, a linear motor, a conveyor, an elevator, a forklift, a tow motor, a heel and axel, a block and tackle, a pulley, a screw, a lever, caster wheels, and/or the like.

FIGS. 3A-3D illustrate a front view (parallel to x axis), a side view (parallel to y axis), a back view (parallel to x axis), and a perspective view, respectively of a light wall 120 embodiment of a vertical cultivation system 100. Light wall 120 may include rack 2 and a lighting structure unit 48. In turn, the lighting structure unit 48 may include one or more of a light column 26, light fixture(s) 30, light source(s) 28, light mover 32, reflectors 38, and ballast box 24. Light source 28 may be any type of light emitting device known in the art including HPS, CDL, double ended bulbs, LEDs, OLEDs, incandescent bulbs, and/or fluorescent bulbs. Light source 28 may be, in certain embodiments, focused on a particular light spectrum, for example, tailored to the plants being cultivated.

Figures 3A, 3B, 3C:
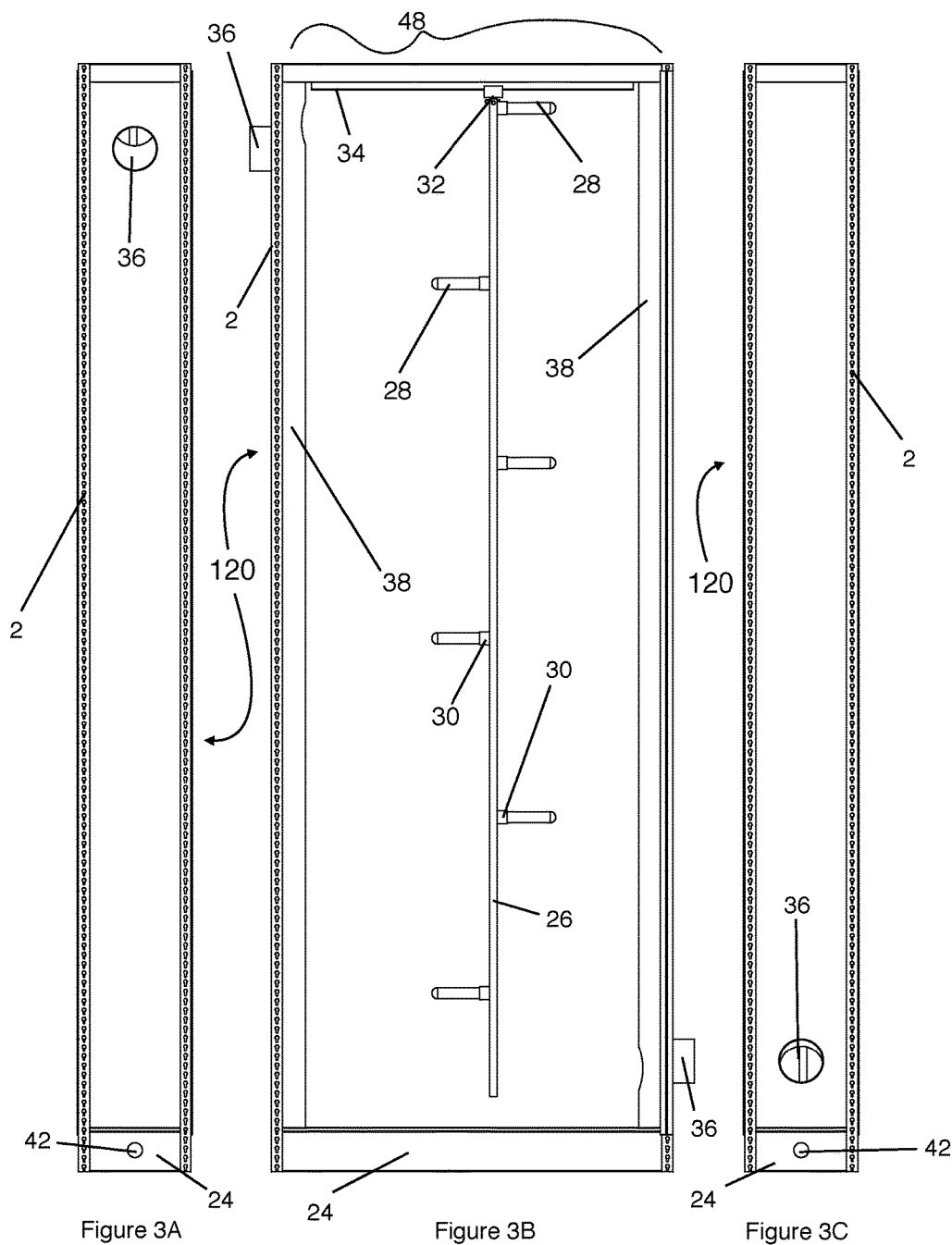
FIGS. 3A-3D depict front, side, back, and perspective views, respectively, of a light wall of a vertical cultivation system according to an embodiment of the present disclosure.

As best depicted in FIG. 3B, light mover 32 may be attached to a bar 34 which may be attached to rack 2, for example at a top location. Light column 26 may be attached to light mover 32. These lighting structure unit 48 elements may be attached through plurality of methods, including but not limited to, fasteners, bolts, and eyehook. Light mover 32 may provide mobile movement, side-to side (e.g., along the y axis), to light column 26 within light wall 120. Light column 26 may include one light fixture 30, or may include a plurality of light fixtures 30 positioned at various distance intervals. Such distance intervals may, for example, correspond to the positions of shelving 10 or plants disposed within a neighboring cultivation wall 110. Light source 28 may be attached to the light fixture 30.

Light column 26 may be produced out of any material such that it may receive and physically support light source 28 and any light fixtures 30. For example, light column 26 may comprise steel, wood, plastic, hard resin, ceramic, and/or any other suitable material known in the art. Light column 26 may be a rigid element. Light column 26 can be formed in any shape including, but not limited to, square, rectangle, triangle, or round. In other embodiments, for example, where light mover 32 is near on a top side of light wall 120, light column 26 need not be rigid and may comprise a hanging wire or cable supporting one or more light sources 38 and light fixtures 30. In some embodiments, the light column 26 length may range between 1'-30'. In alternative embodiments, light column(s) 26 may be configured horizontally, and may attach to the side(s) of rack 2.

Light fixtures 30 can be designed or selected to accommodate virtually any light source 28 type—without limit to style, brand, or size. In some embodiments, light source(s) 28, for example, LEDs may be assembled in strips, strings, or sheets of light emitting devices, and light fixtures 30 may be modified or omitted accordingly. For example, a strip of LED lights may serve as light sources 28, light fixtures 30, and light column 26. In another example, a sheet of LED lights may further obviate or reduce movement advantage provided by light mover 32.

Ballast box 24 may store a plurality of ballasts and electronics, to the extent that they are required to operate each light source 28, or may improve such operation. Ballast box 24 may be configured to store a plurality of any size ballast; there is no limit to style, size, and brand. In some embodiments, the ballast box 24 may extend approximately 14 inches in a horizontal direction (x), approximately 53 inches a depth direction (y), and approximately 5 inches in vertical direction (z). It may include any combination of vents for the purpose of airflow, fans to encourage air movement, and hinges to open the box for maintenance. Alternative embodiments may include ballast box 24 without has no vents or fans.

As depicted in FIGS. 3A-3D, a light mover 32 may provide mobile movement to a light column 26 with a plurality of light fixtures 30 at various distance intervals and corresponding light sources 28. Such light wall 120 may include a ballast box 24 located, for example, disposed on the bottom side. In other embodiments, one or more light columns 26 may remain static; ballast box 24 may be located outside the lighting system in a remote location, on the sides of the rack 2, or at the top of the rack 2. Rack 2 that receives the lighting structure has no maximum or minimum height, depth, or length, but its dimension height and length dimensions preferably correspond to those of cultivation walls.

As further depicted in FIGS. 3A-3C, light wall 120 may include one or more end plate vents 36 to provide cooling to the ballast box 24 and/or the lighting structure unit 48 generally. (Vents 36 are omitted from FIG. 3D.) As shown in FIGS. 3A-3C, an embodiment of the present disclosure may include an end plate vent 36 the top of the front of light wall 120 and another at the bottom of the back of light wall 120. Alternative embodiments may be characterized by a vice versa placement of end plate vents 36, or the provision of one or more end plate vents 36 at various locations on the front, back, top, bottom, or sides of light wall 120.

Figure 3D:
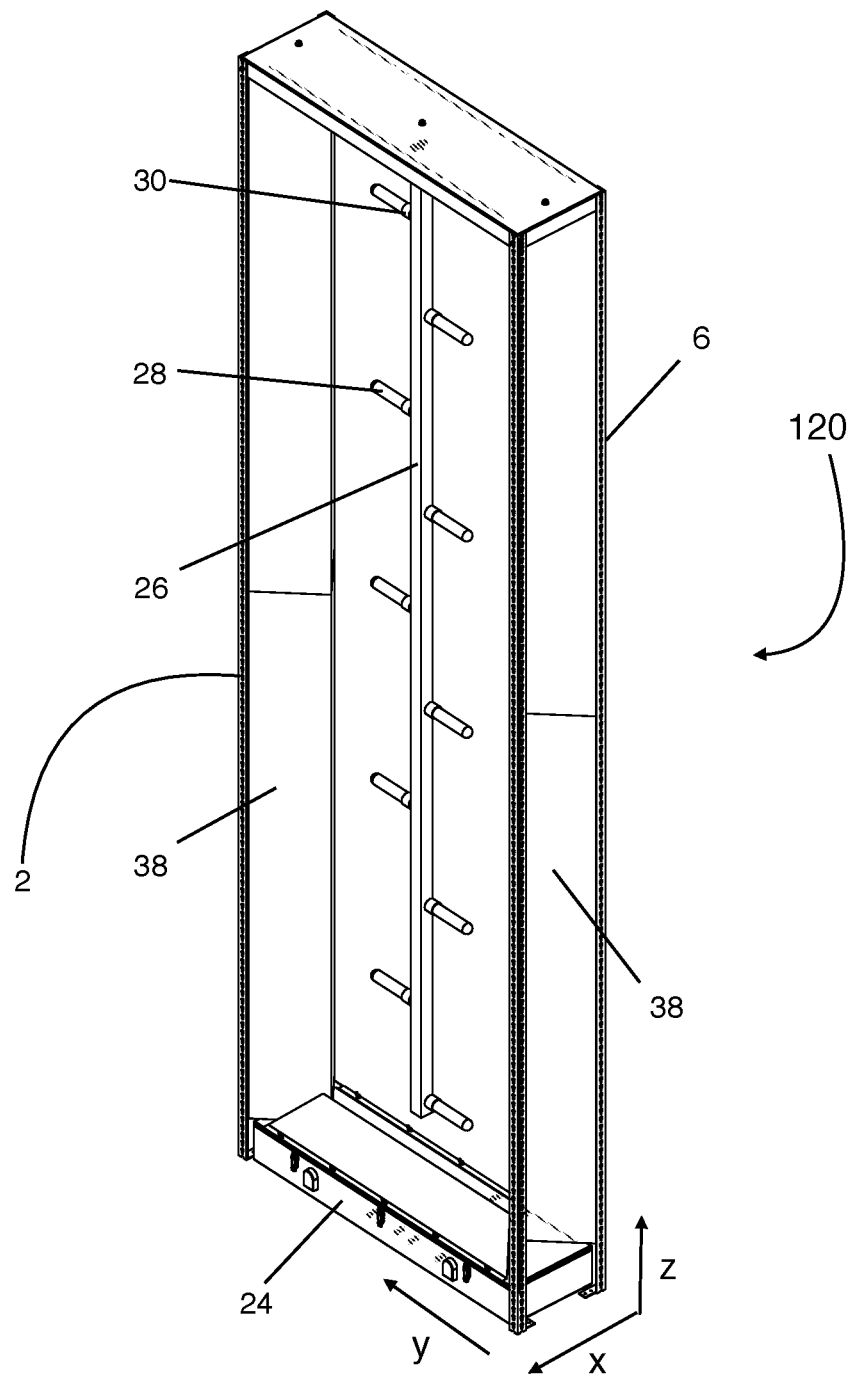

As illustrated in FIGS. 3B and 3D, reflectors 38 of light wall 120 may be attached to rack 2 and provide for the reflection of light rays from the light sources 28 to plants within plurality of storage units 4. In alternative embodiments, reflectors 38 may comprise or may be being integrated with vents that direct airflow through vertical cultivation system 100 or portions thereof. Reflectors 38 may be placed on the sides, bottom, and/or top of the light wall. Reflectors 38 may be rounded, flat, or bent in any form with the purpose of reflecting light to plants in, for example, neighboring cultivation walls 110. Reflectors 38 may be made out of any reflective material known in the art, for example, mylar, foylon, paint, metal, foil, white plastic, or aluminum.

Figure 4:
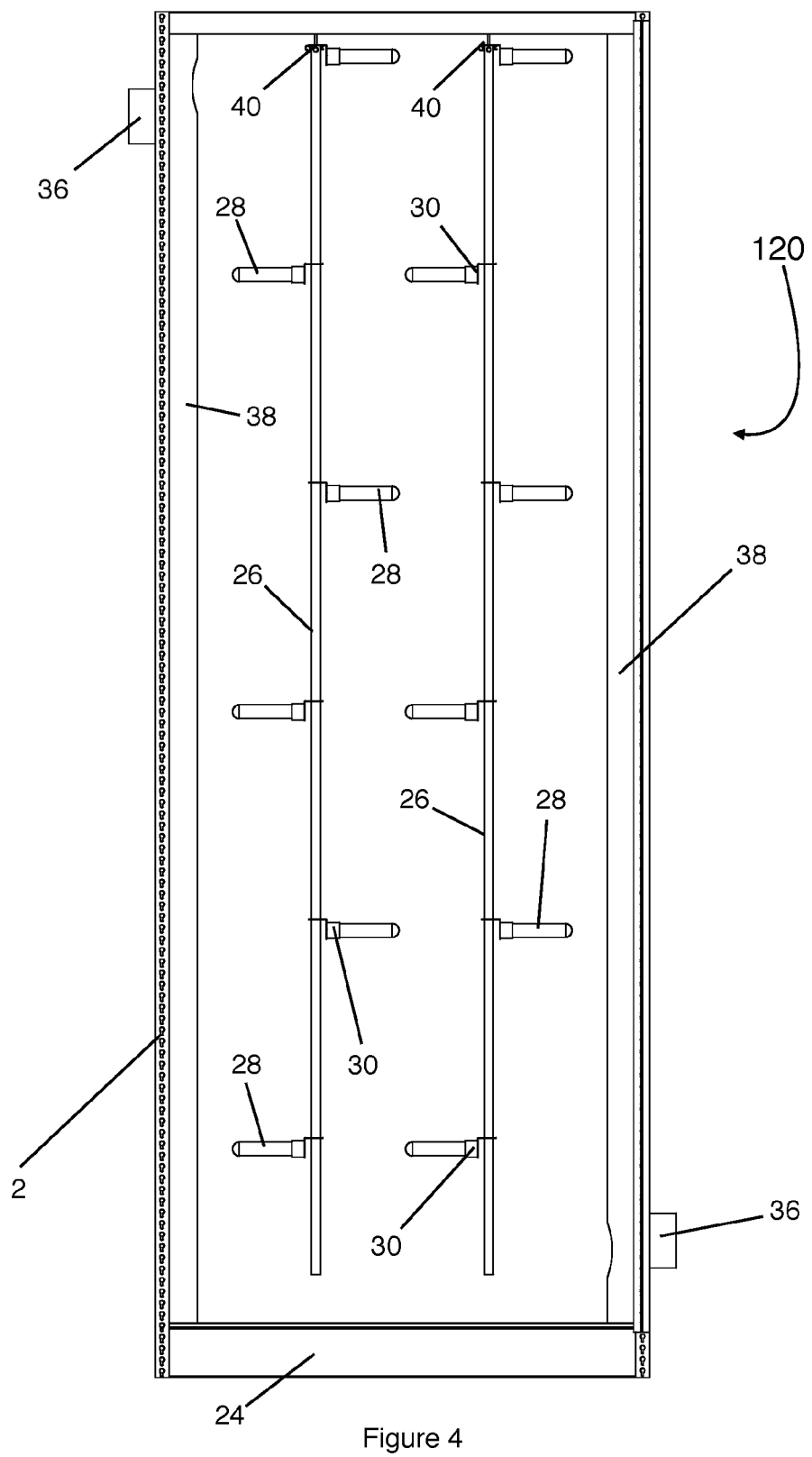
FIG. 4 is a side view of a light wall of a vertical cultivation system according to another embodiment of the present disclosure.

FIG. 4 is a side view (along they axis) of light wall 120 of vertical cultivation system 100 according to an alternative embodiment of the present disclosure. The light wall 120 embodiment of FIG. 4 is similar to that depicted in FIGS. 3A-3D, except that it includes a plurality of light columns 26, each of which support a plurality of light fixtures 30 and light sources 28. As shown, light columns 26 may be attached to rack 2, for example at the top side of wall 120, by a static fastener 40. Although FIG. 4 depicts a lighting structure unit 48 with two static light columns 26, alternative embodiments with one, three, four, or more light columns 26 are contemplated. Further differing amounts of light fixtures 30 and light sources 28 provided on each light column 26 are contemplated. For example, one embodiment could provide a single light column 26 with a single fixture 30 and single light source 28.

Figure 5:
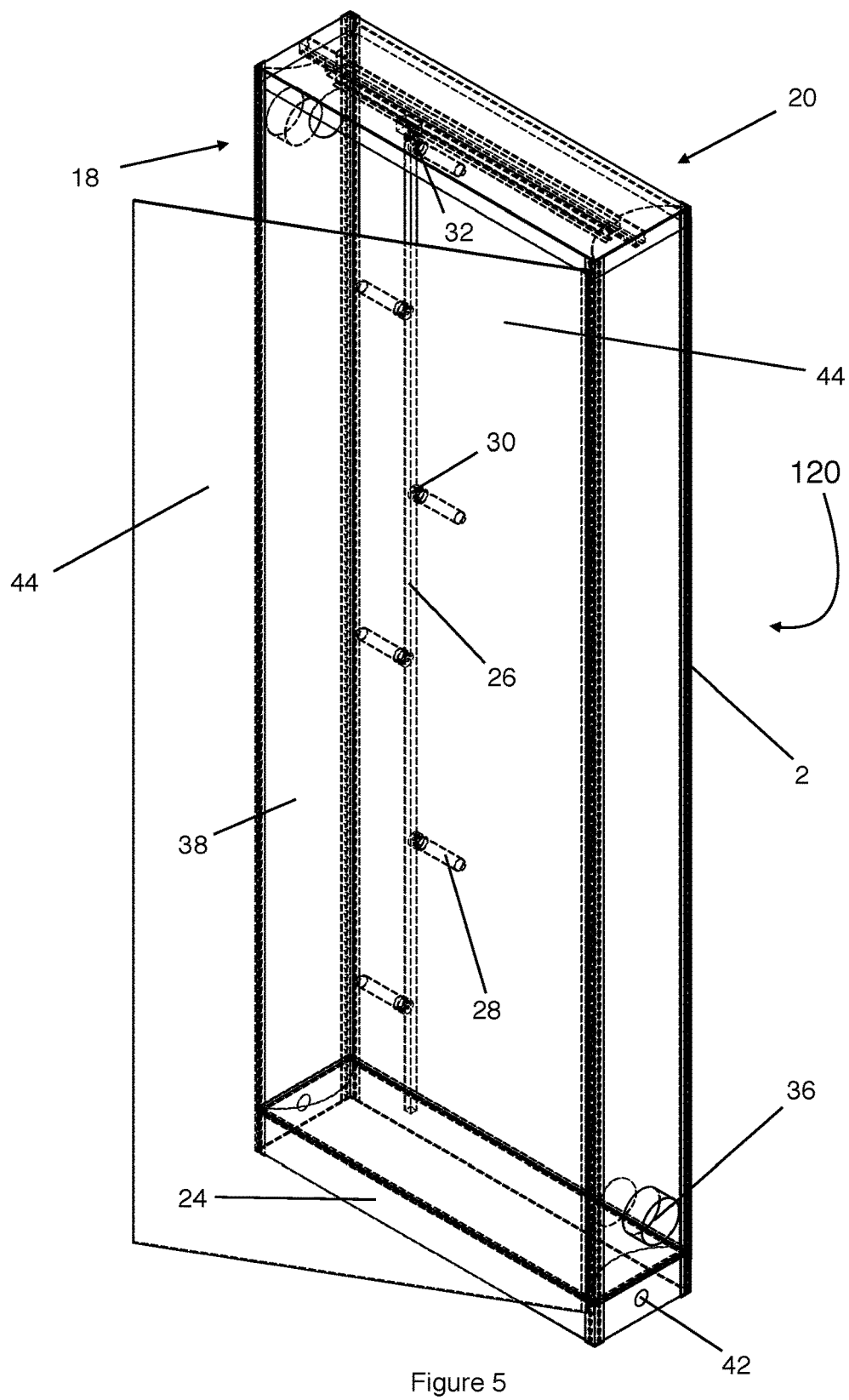
FIG. 5 is a perspective view of a light wall of a vertical cultivation system according to yet another embodiment of the present disclosure.

FIG. 5 is a perspective view of light wall 120 of vertical cultivation system 100 according to an embodiment of the present disclosure. In this light wall 120 embodiment, the lighting structure unit 48 is fully or partially enclosed by one or more transparent panes 44. Such panes 44 may be comprised of glass or another material that allows light rays (preferably including UV light) to pass through. Each pane 44 may comprise one piece or a plurality of pieces. Each pane 44 may open from either first side 18 and/or second side 20. For example, as shown in FIG. 5, pane 44 is opened on first side 18. Pane 44 is preferably hinged either vertically (as shown) or horizontally, and is thereby attached to the top, bottom, front, or back side of light wall 120. Pane 44 preferably provides a seal when closed, which may allow the end plate vents 36 to operate more efficiently. Advantageously, inclusion of panes 44 may permit the temperature and other environmental conditions within light wall 120 to be controlled separately from the temperature and other environmental conditions to which the cultivated plants are exposed, e.g., in an adjacent cultivation wall 110 or otherwise. This may be beneficial, for example, in situations where light sources 28 that generate an undesirable amount of heat are utilized.

Figure 6:
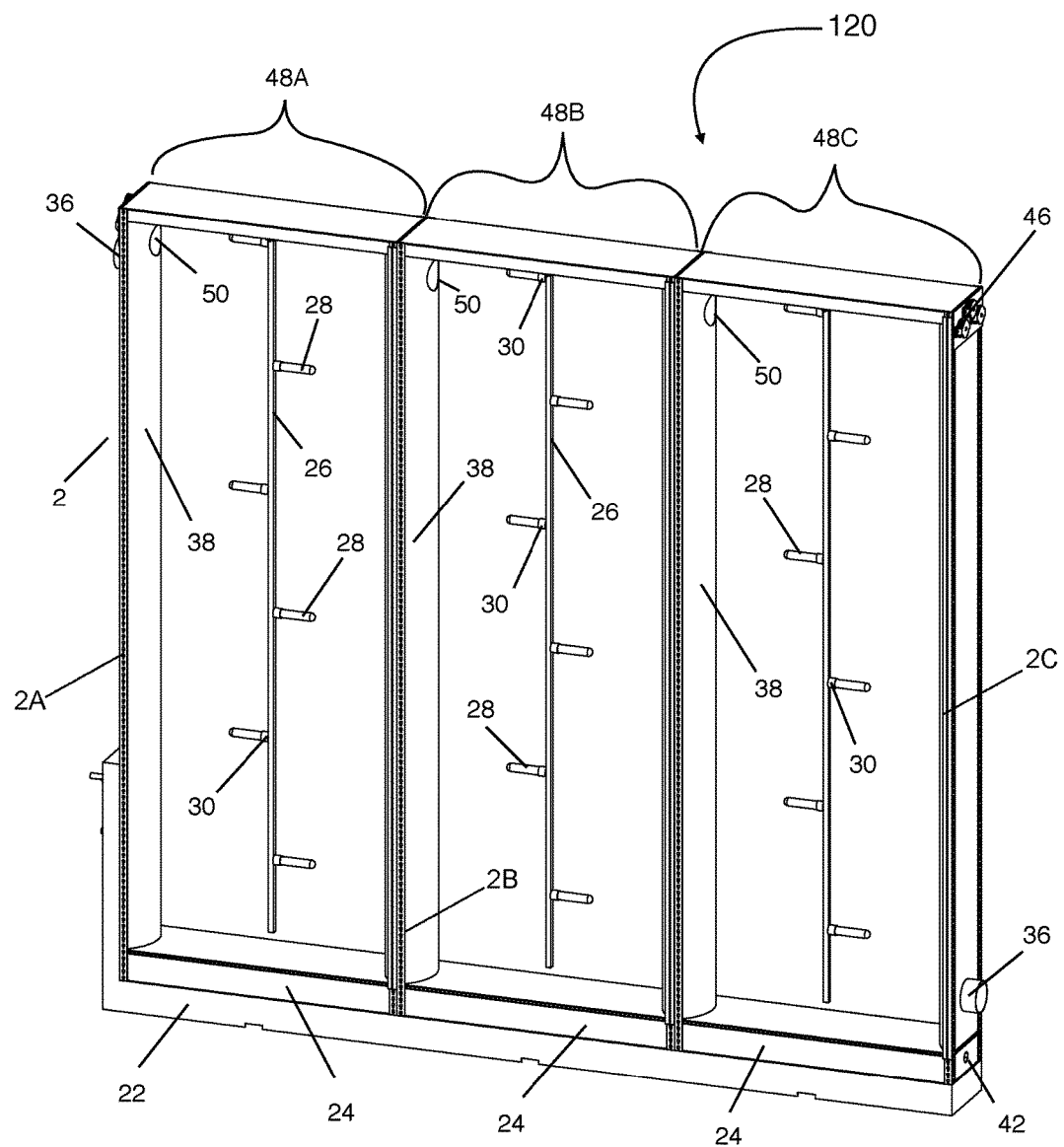
FIG. 6 is a perspective view of a light wall of a vertical cultivation system according to yet another embodiment of the present disclosure.

FIG. 6 is a perspective view of light wall 120 of vertical cultivation system 100 that includes mobile carriage 22 and a plurality of lighting structure units 48—here depicted as lighting structure units 48A, 48B, and 48C. Each lighting structure unit 48A, 48B, 48C may include reflectors 38, a ballast box 24, light mover 32, and light column 26, light fixtures 30, and/or light sources 28, and may be secured to the mobile carriage 22. Each lighting structure units 48 may be supported by rack 2. In some embodiments, rack 2 may be assembled from multiple sub-racks 2A, 2B, 2C that support lighting structure units 48A, 48B, 48C, respectively. As shown, rack 2 may be configured as to attach and secure lighting structure units 48A and 48B together (for example by securing sub-racks 2A and 2B), and lighting structure units 48B and 48C together (for example by securing sub-racks 2B and 2C).

FIG. 6 further depicts the inner vents 50 that may allow for a flow of air between and through lighting structure units 48A, 48B, and 48C. By positioning a fan, air mover, HVAC system, or the light on one or more end plates 36, air may be circulated through light wall 120 for exhaust or other proposes. As shown, this may be accomplished with end plate vents 36 located only on lighting structure units 48A and 48C.

FIG. 6 additionally depicts exemplary position for wiring hole(s) 42 that may allow the passage of wires used in of the light wall 120 or a lighting structure unit 48, for example, to power ballast 24. In other embodiments, additional wiring holes 42 may be provided on the sides, top, or even bottom of the lighting structure units 48A, 48B, 48C. Mobile carriage 22 may provide movement for light wall 120 (including lighting structure units 48A, 48B, 48C) within the vertical cultivation system 100, or otherwise.

Figure 7:
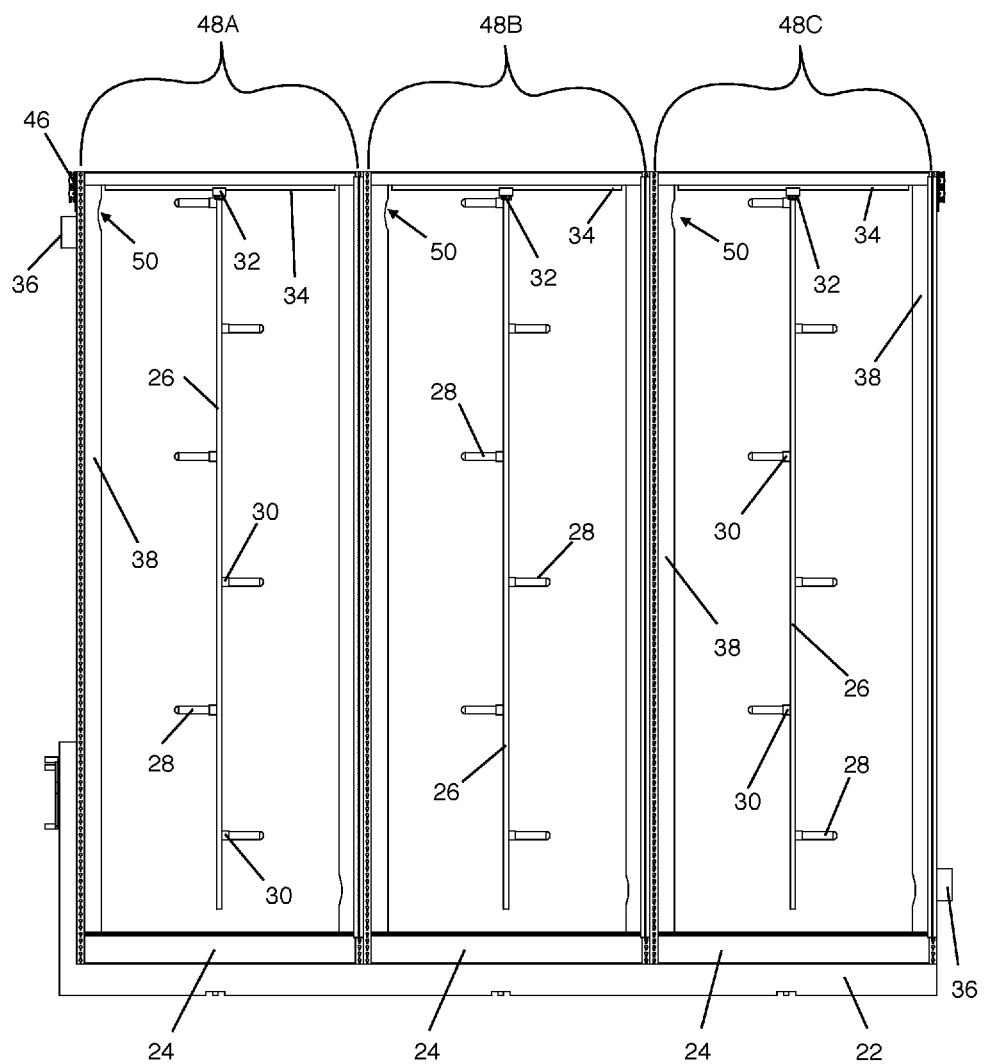
FIG. 7 is a side view of the light wall of FIG. 6.

FIG. 7 is a side view (along they axis) of the light wall 120 depicted in FIG. 6.

Figure 8:
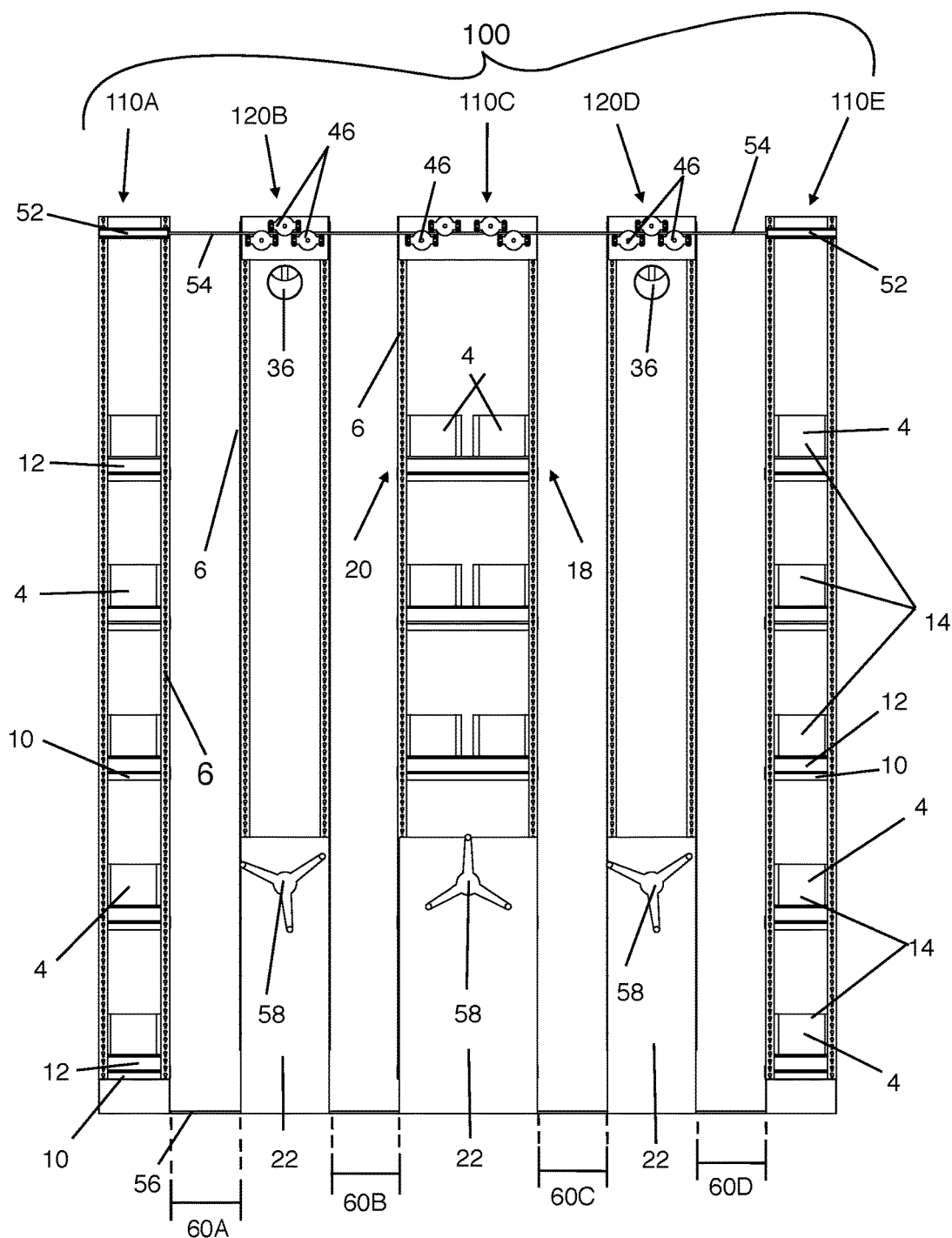
FIG. 8 is a front view of a vertical cultivation system according to an embodiment of the present disclosure.

FIG. 8 is a front view (along the x axis) of vertical cultivation system 100 according to an embodiment of the present disclosure. As shown, the plurality of cultivation walls 110A, 110C, 110E and light walls 120B, 120D are represented in the current embodiment. Preferably, each wall 110A, 120B, 110C, 120D, 110E is be disposed in a substantially parallel planar arrangement with respect to the remaining walls of system 100. Cultivation walls 110A, 110E are in a static position, and may be secured to the wall, ceiling, or ground 66 (not shown), thus restricting movement. Although cultivation walls 110A, 110E are in a static position in the depicted embodiment, they are not required to be static and can be provided with mechanical advantage for movement.

Cultivation walls 110A, 110E may be single cultivation walls 110 and thereby provide a plurality of shelving 10, trays 12, and/or storage units 4 on one side only. Cultivation wall 110C may be a double cultivation wall with first side 18 and second side 20, and may also provide a plurality of shelving 10, trays 12, and storage units 4. The embodiment of FIG. 8 provides cultivation walls 110A, 110C, 110E with five rows 14 of storage units 4, shelves 10, and trays 12. In alternative embodiments, the respective heights of shelving 10 represented on the cultivation walls 110 may be equally distributed, randomly distributed, or adjusted to accommodate different plant sizes, types, growing conditions, and stages of development. The configuration of the shelves 10 may be easily changeable, for example, by using fasteners that connect directly to the vertical support members 6.

Light wall 120B may be disposed between cultivation walls 110A and 110C, and thereby provide light to plants in cultivation wall 110A and second side 120 of cultivation wall 110C. Light wall 120D may be disposed between cultivation walls 110C and 110E, and thereby provide light to plants in cultivation wall 110E and first side 18 of cultivation wall 110C. Both light walls 120B, 120D may include a mobile carriage 22, which may provide movement through a track and wheel system that is locked into an elongated rail 56 on the floor. Light wall 120B can move with ease along rail 56 in a horizontal direction, and may thus remain aligned as it moves towards or away from cultivation walls 110A and 110C, thereby altering distances 60A and 60B, respectively. Light wall 120D can move with ease along rail 56, and may thus remains aligned as it moves towards or away from cultivation walls 110C and 110E, thereby altering distances 60C and 60D, respectively.

Additionally, cultivation wall 110C may include a mobile carriage 22, which may provide movement through a track and wheel system that is locked into an elongated rail 56 on the floor. Cultivation wall 110C can move with ease along rail 56, and may thus remain aligned as it moves towards or away from light walls 120B and 120D, thereby altering distances 60B and 60C, respectively.

By altering distances 60A, 60B, 60C, 6D, system 100 can be varied to accommodate different plant sizes, types, growing conditions, light needs, and stages of development. The distances may be equal, or they may be unequal, as desired. Further altering distances 60A, 60B, 60C, 6D may permit a person to access the interior of the cultivation system for maintenance of cultivated plants or the system 100. For example, cultivation wall 110C, and light walls 120B, 120D may be move towards cultivation wall 110A, such that walls 110A, 120B, 110C, 120D are adjacent, thus maximizing distance 60D.

FIG. 8 further depicts an exemplary support trolley system. A stability bar 54 may run along walls 110A, 120B, 110C, 120D, 110E. The stability bar 54 may be held in secure position with a mount 52 on walls 110A and 110E. The stability bar 54 may be captured through trolley wheels 46 on movable walls 120B, 110C, and 120D. This support trolley system provides the ability for system 100 to achieve larger depths x and larger vertical z heights, while preventing or reducing the likelihood of a dangerous tip over event.

As additionally depicted in FIG. 8, movable walls 120B, 110C, and 120D may include a hand wheel 58 to initiate and/or control the movement of each mobile carriage 22. In some embodiments, hand wheel 58 may be locked in and out of position to provide safety of system 100. It is contemplated that vertical cultivation system 100 embodiments with greater or lower numbers of cultivation walls 110 and light walls 120 than in FIG. 8. In preferred embodiments, each pair of cultivation walls has a light wall disposed there between, and vice versa. For example, there may be a total number of 3, 7, 9, 11, 13, 15, or more walls.

FIG. 9B depicts a side view of the vertical cultivation system 100 embodiment of FIG. 8, wherein the support trolley system is presented in further detail. FIG. 9A illustrates the portion of system 100 that is detailed in FIG. 9B. As shown, stability bar 54 may be secured by a mount 52 located on wall 110A. Further as shown, the stability bar 54 may proceed through the trolley wheels 46 located on walls 120B and 110C. The stability bar 54 may be any shape known in the art suitable for this purpose. This trolley system may permit for the safe and secure movement of the movable walls. The trolley wheels 46 may be secured to racks 2 of the movable walls by fasteners 62. For example, as shown, single walls 120B and 120D may each have three trolley wheels 46 and double wall 110C may have four trolley wheels 46. It may be noted that the depicted mounting areas for trolley wheels 46 and mounts 52 are exemplary only. Alternative embodiments may include differing numbers of wheels 46 on any given wall, a plurality of stability bars 54, and a plurality of mounts 52 on non-moving wall(s). In other embodiments, a trolley system may be omitted entirely.

Figure 11:
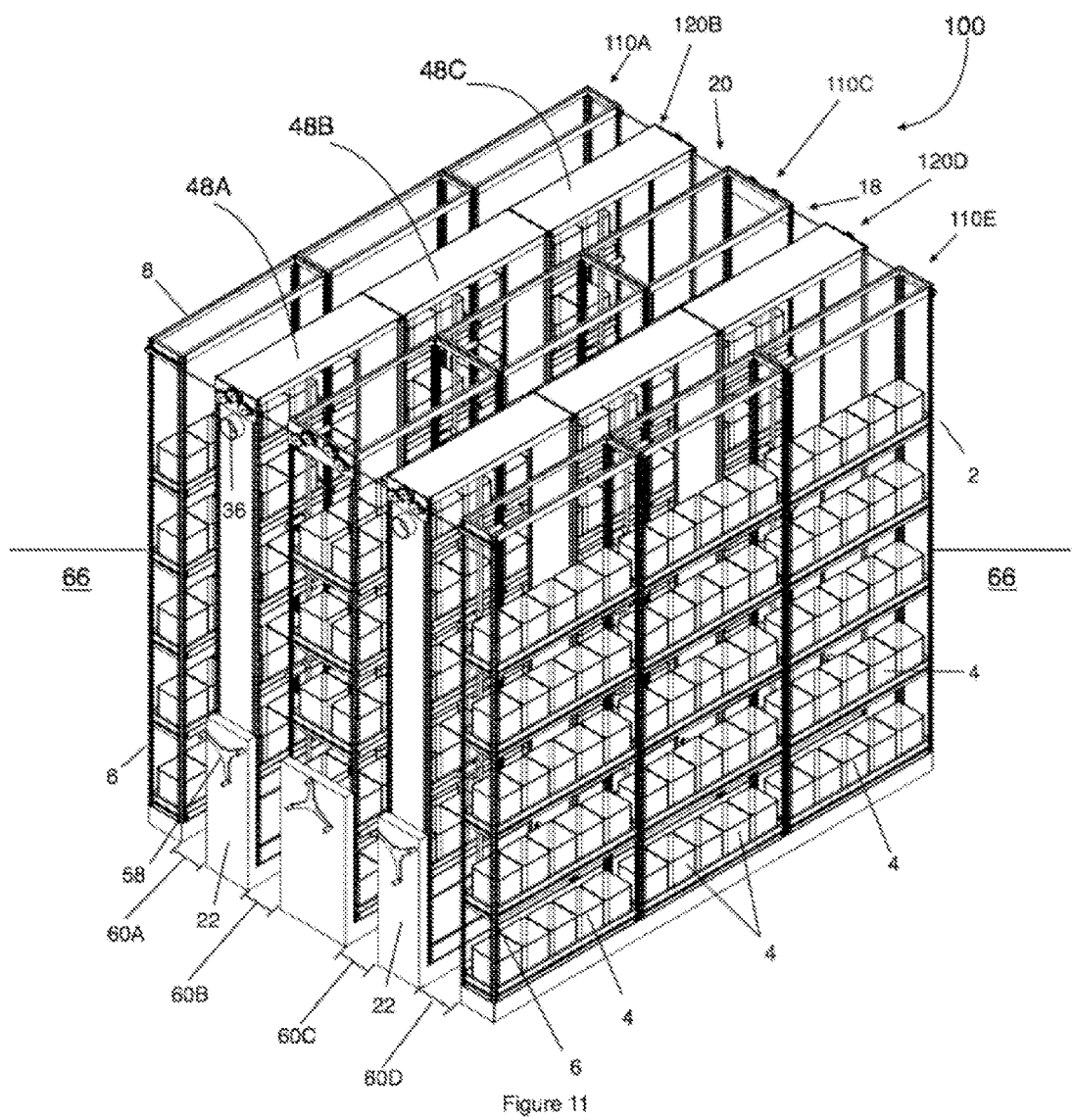
FIG. 11 is a perspective view of the vertical cultivation system of FIG. 8.

FIG. 11 is a perspective view of the cultivation system 100 of FIG. 8. Fasteners and/or brackets may be used to connect walls 110A and 110E to the ground 66. This may improve system stability and safety. As shown, racks 2 of cultivation walls 110A and 110E may comprise five shelves 10 with a 5×15 array of storage units 4. Rack 2 of cultivation wall 110C may comprise ten shelves 10 with a 5×15 array of storage units 4. Light walls 120B and 120D, each include a plurality of lighting structure units 48A, 48B, 48C, that may provide light and heat to plants in cultivation walls 110A, 110C, 110E. Each of walls 120B, 110C, 120D may include a mobile carriage 22. Each wall may include a plurality of vertical support members 6 and horizontal support members 8 to provide stability.

Embodiments of methods of growing and cultivating plants with system 100 are disclosed. In one embodiment, described with reference to FIG. 11, cultivating wall 110A can receive a plurality of immature plants. Second side 20 of cultivating rack 110C can also receive a plurality of immature plants. Immature plants are typically smaller in size and may require lighting wall 120B to be closer, thus walls 120B and 110C may be moved towards wall 110A, thereby reducing distances 60A and 60B. First side 18 of cultivating wall 110C may receive a plurality of mature plants. Cultivating wall 110E may also receive a plurality of mature plants. Mature plants typically require greater distance from a light source, here light wall 120D. Increasing distances 60C and 60D, may simultaneously reduce distances 60A and 60B, thereby accommodating both mature plant growth and immature plant growth as appropriate. In this manner, the production of both immature and mature plants within the current embodiment of FIG. 11, allows for system 100 to regularly adjust for the various stages of plant growth. In alternative embodiments, cultivating wall 110E may include mobile carriage 22 to enable its movement, thereby increasing system 100's capacity and ability to accommodate for various plants in various conditions.

Figure 12:
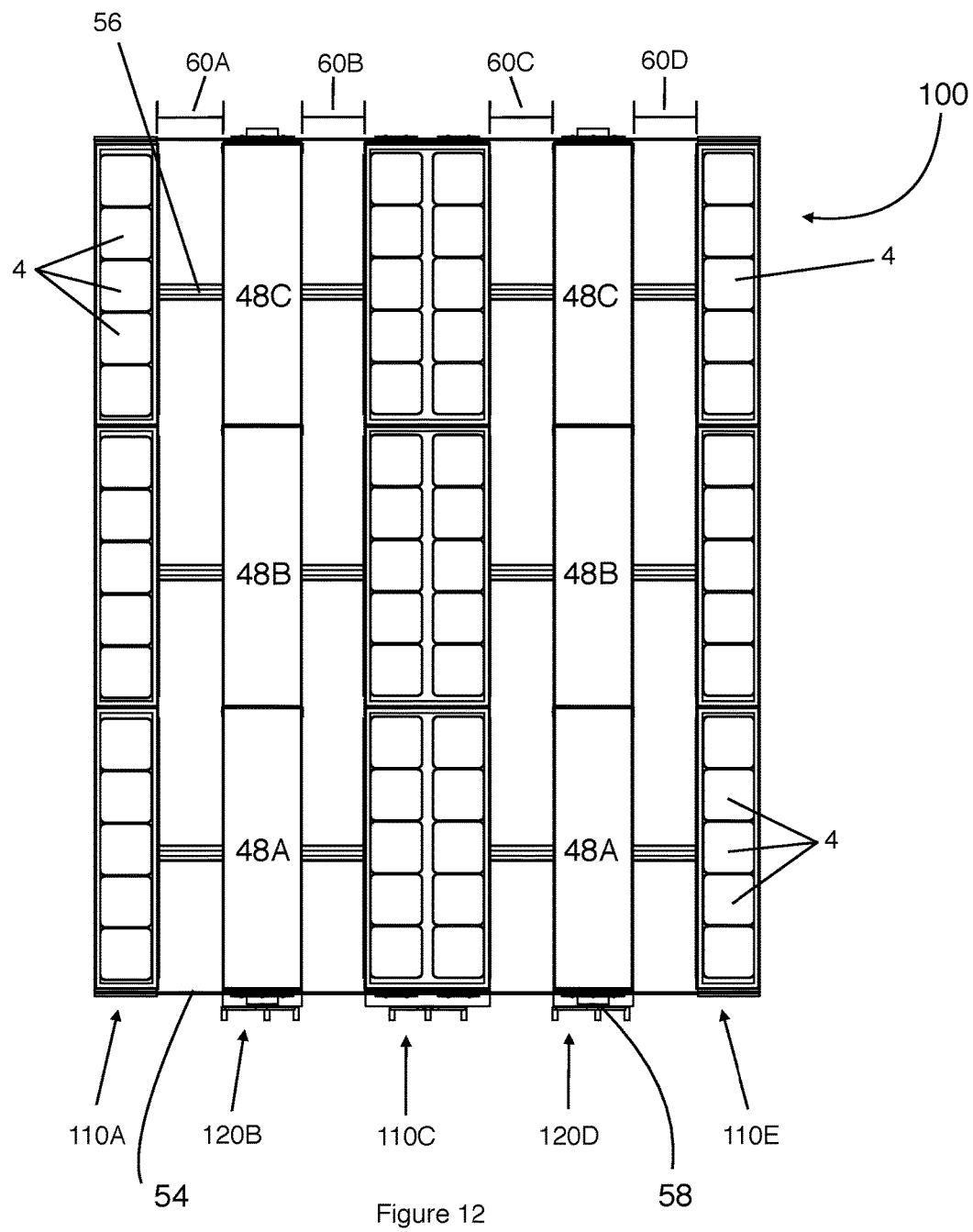
FIG. 12 is a top plan view of the vertical cultivation system of FIG. 8.

FIG. 12 is a top plan view of a vertical cultivation system 100 embodiment consistent with FIG. 8.

Figure 13:
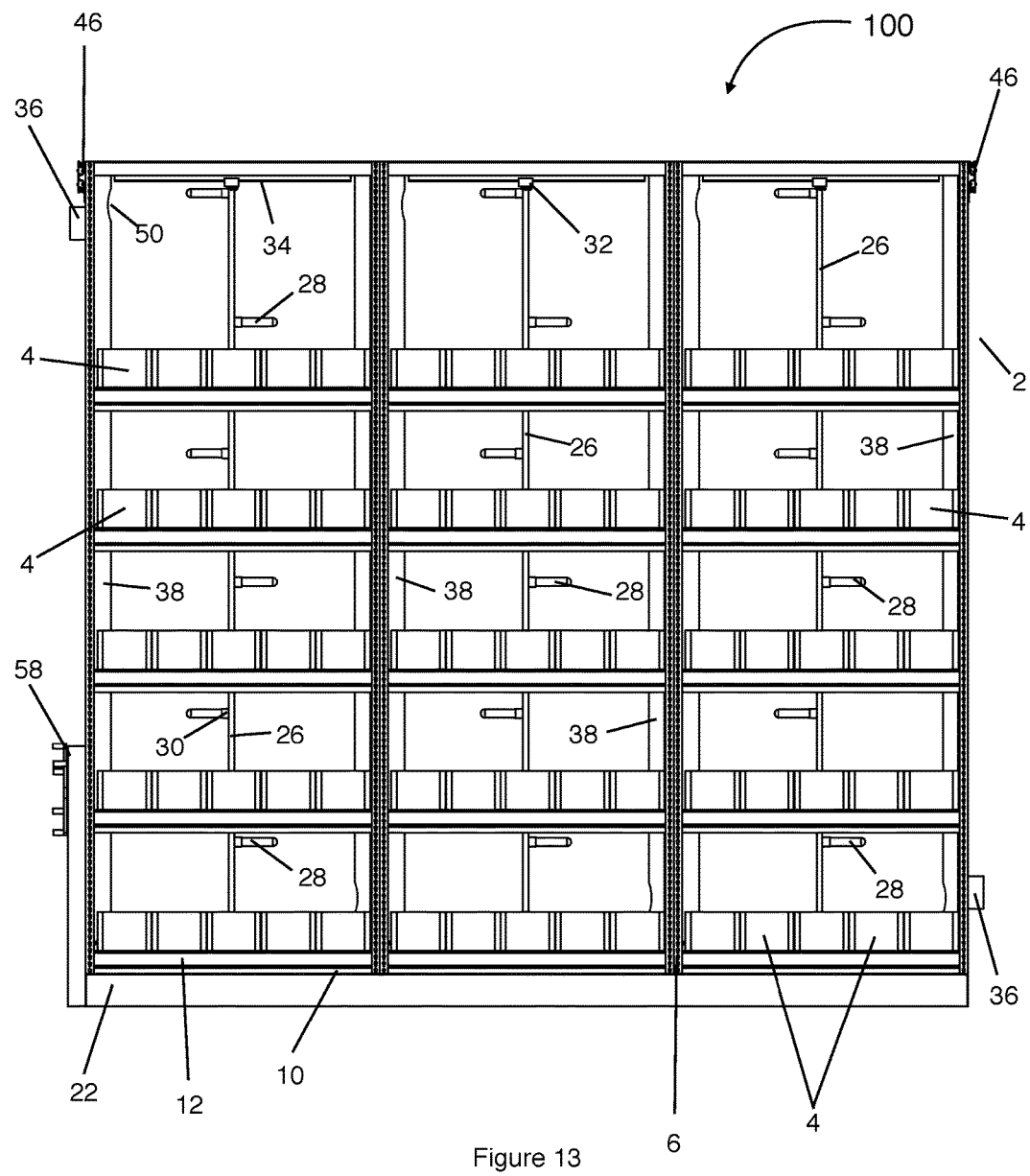
FIG. 13 is a side view of the vertical cultivation system of FIG. 8.

FIG. 13 is a side view (along they axis) of a vertical cultivation system 100 embodiment consistent with FIG. 8. FIG. 13 illustrates an exemplary pattern of light sources 28 within a plurality of lighting structure units 48 with respect to the storage units 4. Alternative embodiments may include have a different pattern of light sources 28 or other types of light sources. For example, each lighting structure unit 48 may have two light columns 26 with six light sources 28 each. The inclusion of light mover 32, may offer increased efficiency with respect to the number of light sources. 28. It may be observed that, in this and other exemplary embodiment embodiments, the lighting structure units 48 on light walls 120B and 120D may remain substantially aligned and parallel with cultivation walls 110A, 110C, 110E as various walls are moved. In other words, wall movement, light columns 26 within the lighting structure units 48 are moved perpendicular with respect to the cultivation walls 110A, 110C, 110E.

Figure 14:
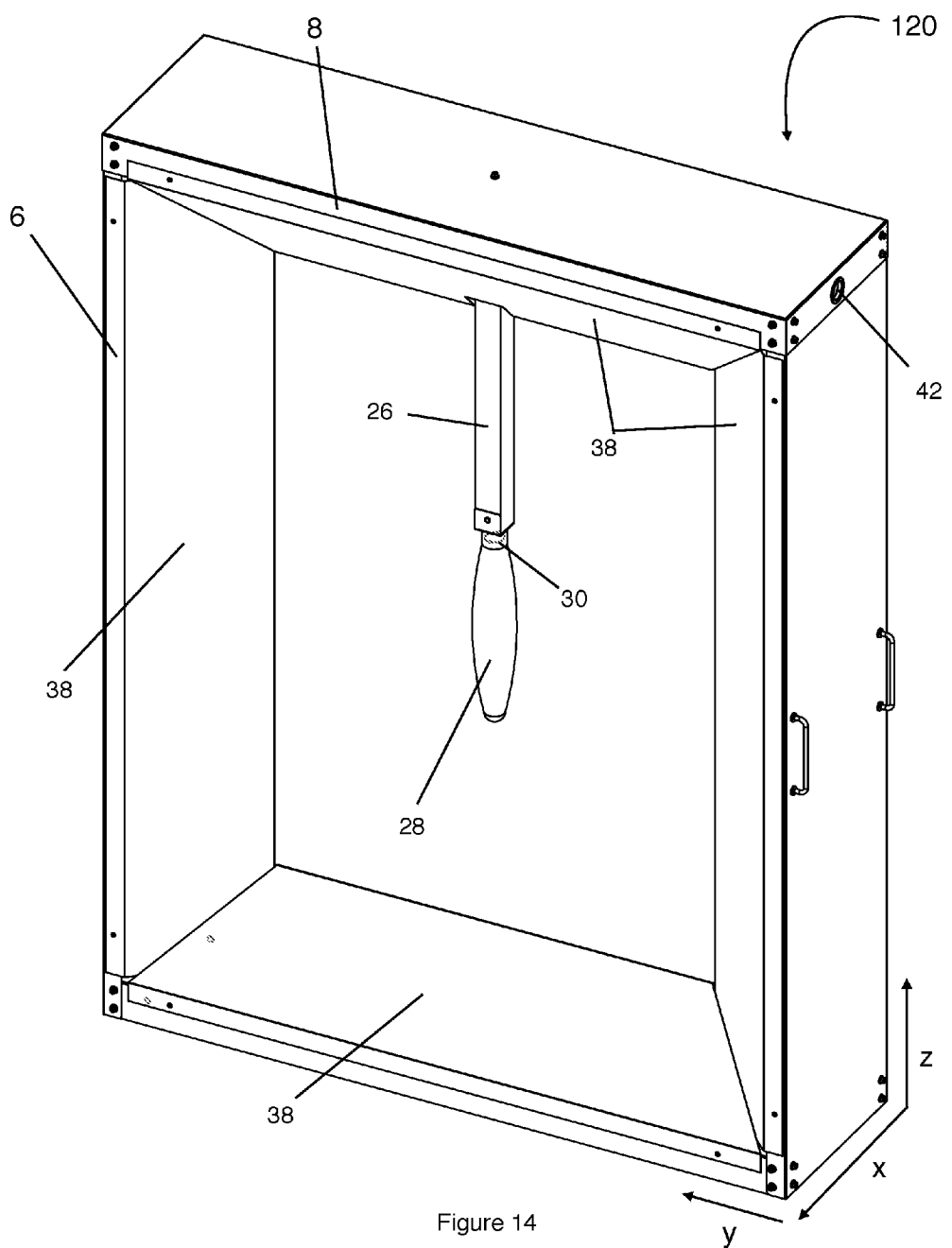
FIG. 14 is a perspective view of a lighting wall of a vertical cultivation system according to yet another embodiment of the present disclosure.
Figure 15:
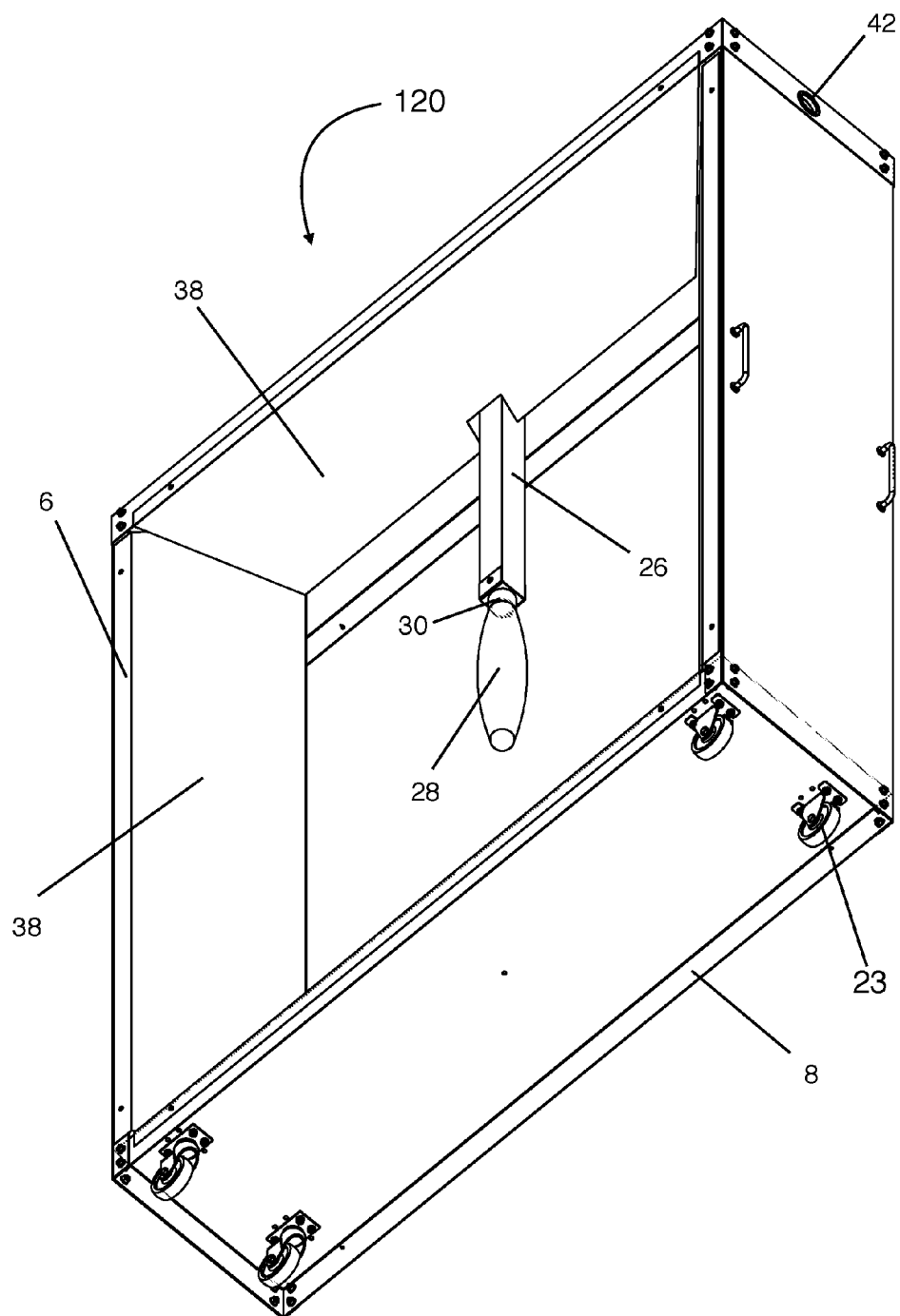
FIG. 15 a bottom perspective view of the lighting wall of FIG. 14.
Figure 16:
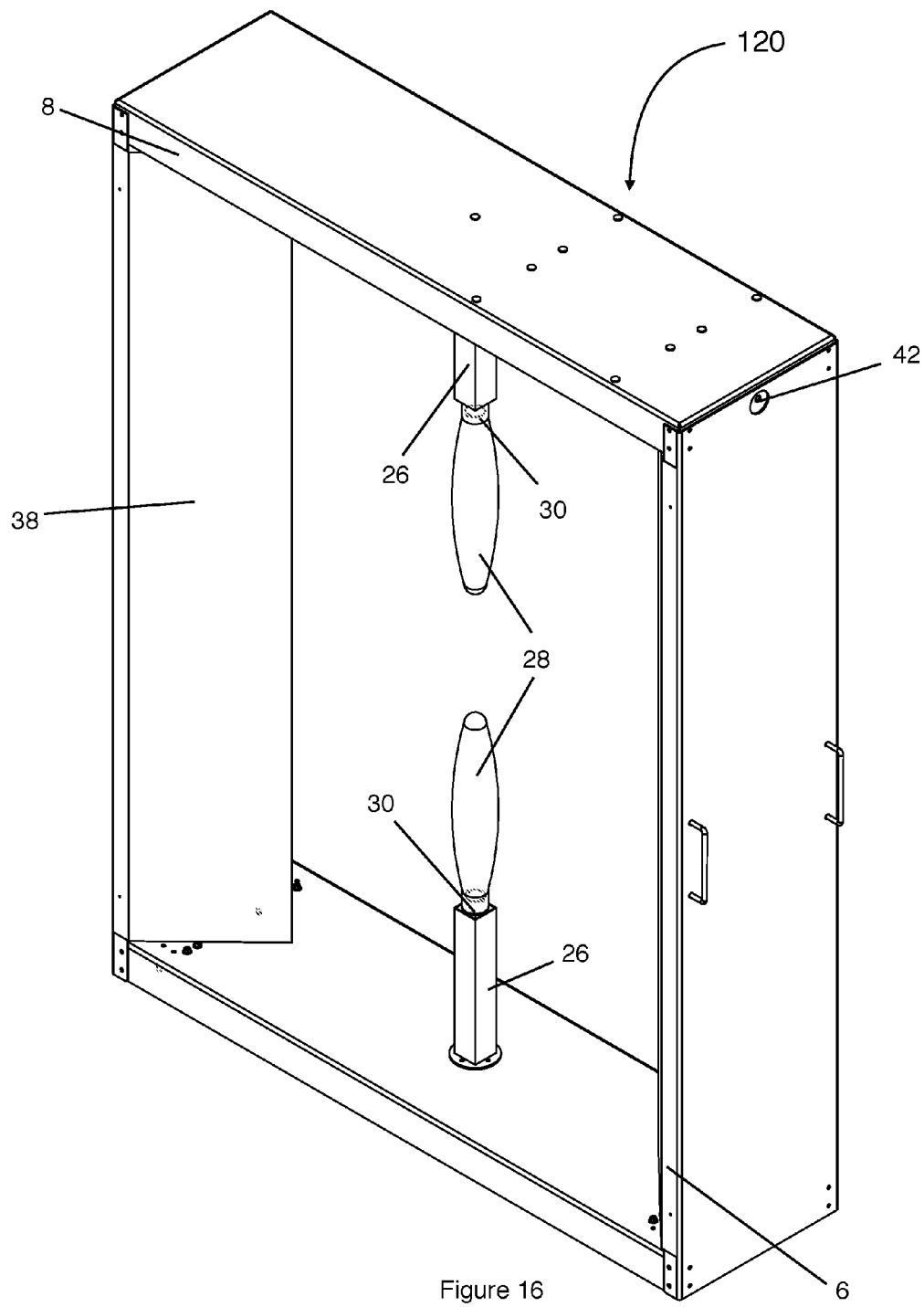
FIG. 16 is a perspective view of a lighting wall of a vertical cultivation system according to yet another embodiment of the present disclosure.
Figure 17A:
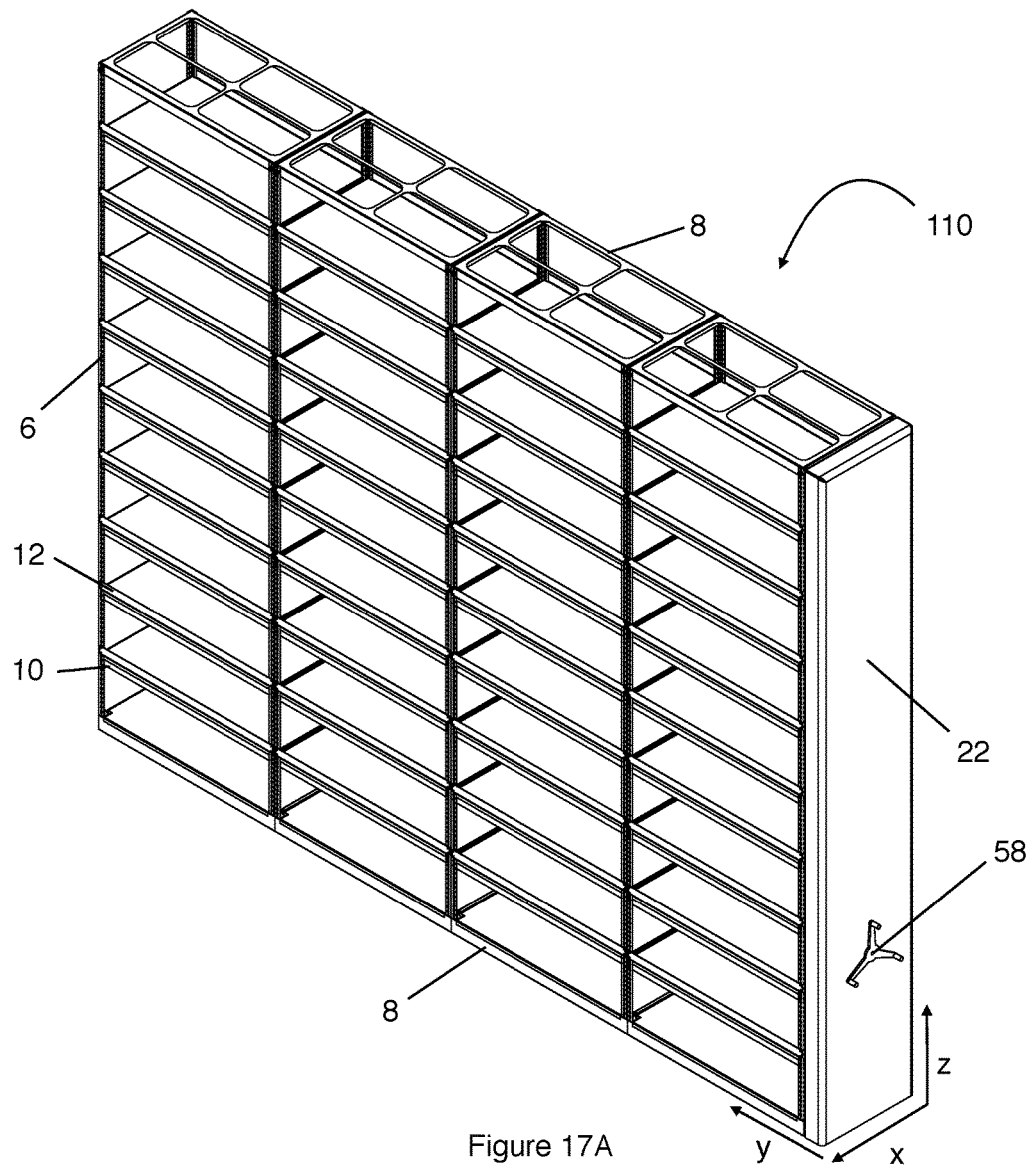
FIGS. 17A-F are perspective, top plan detail, top perspective detail, side detail, side perspective detail, and bottom perspective detail views, respectively, of a cultivating wall of a vertical cultivation system consistent with the present disclosure, which illustrate selected ornamental design elements.
Figure 17B:
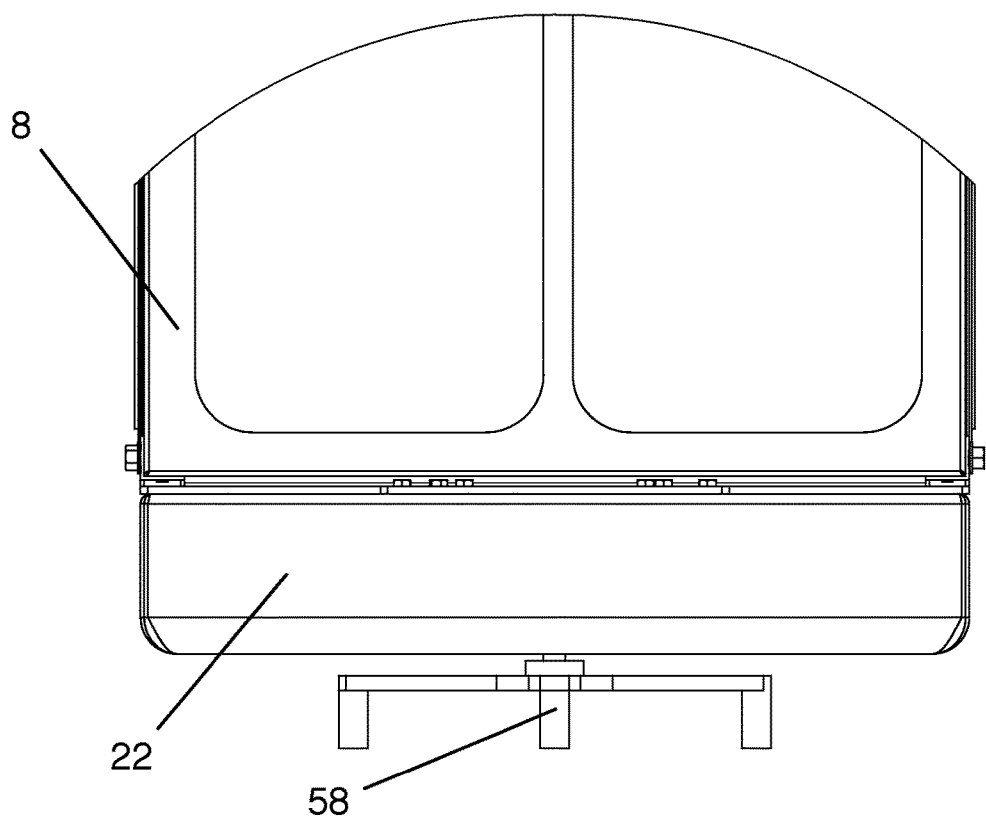
Figure 17C:
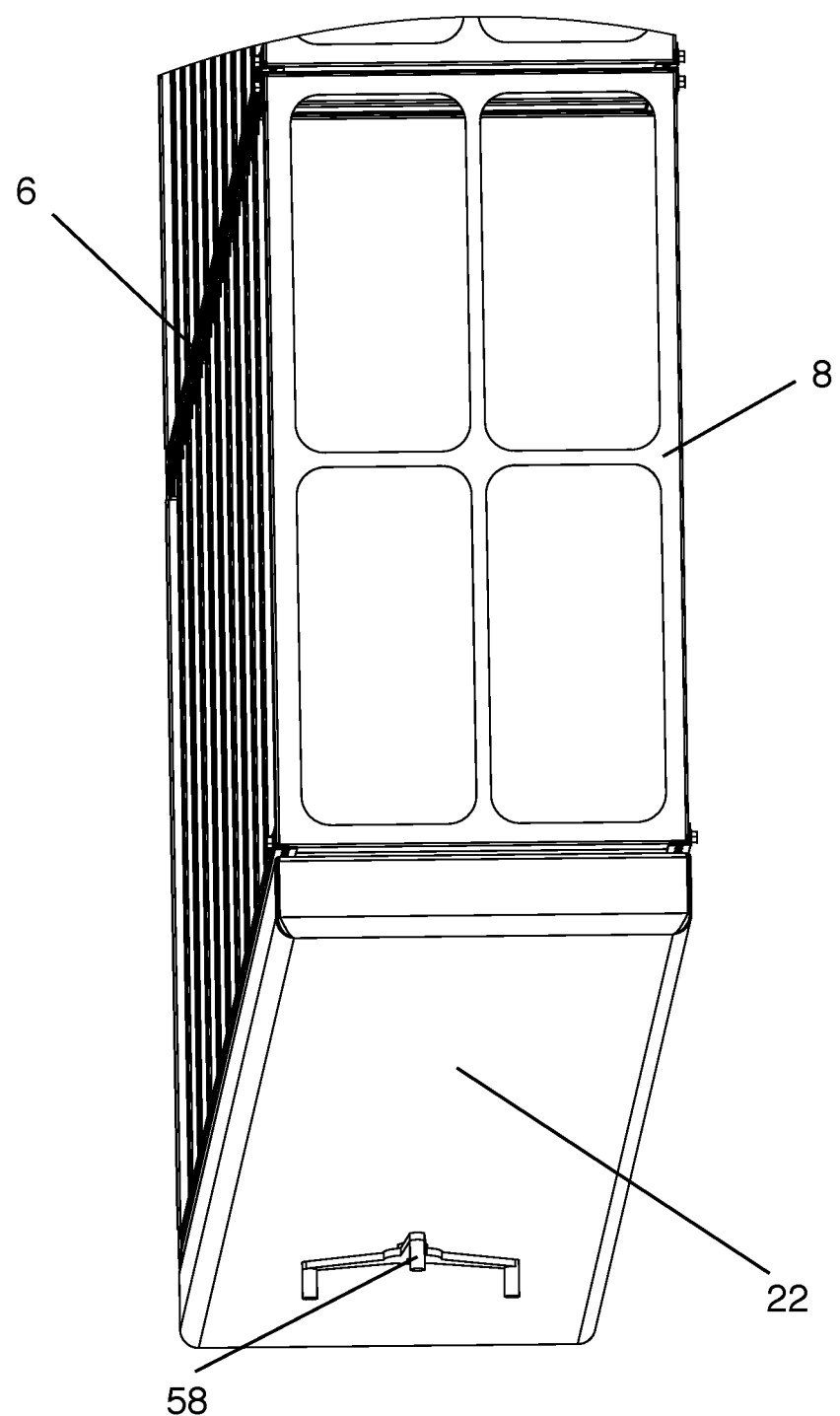
Figures 17D, 17E:
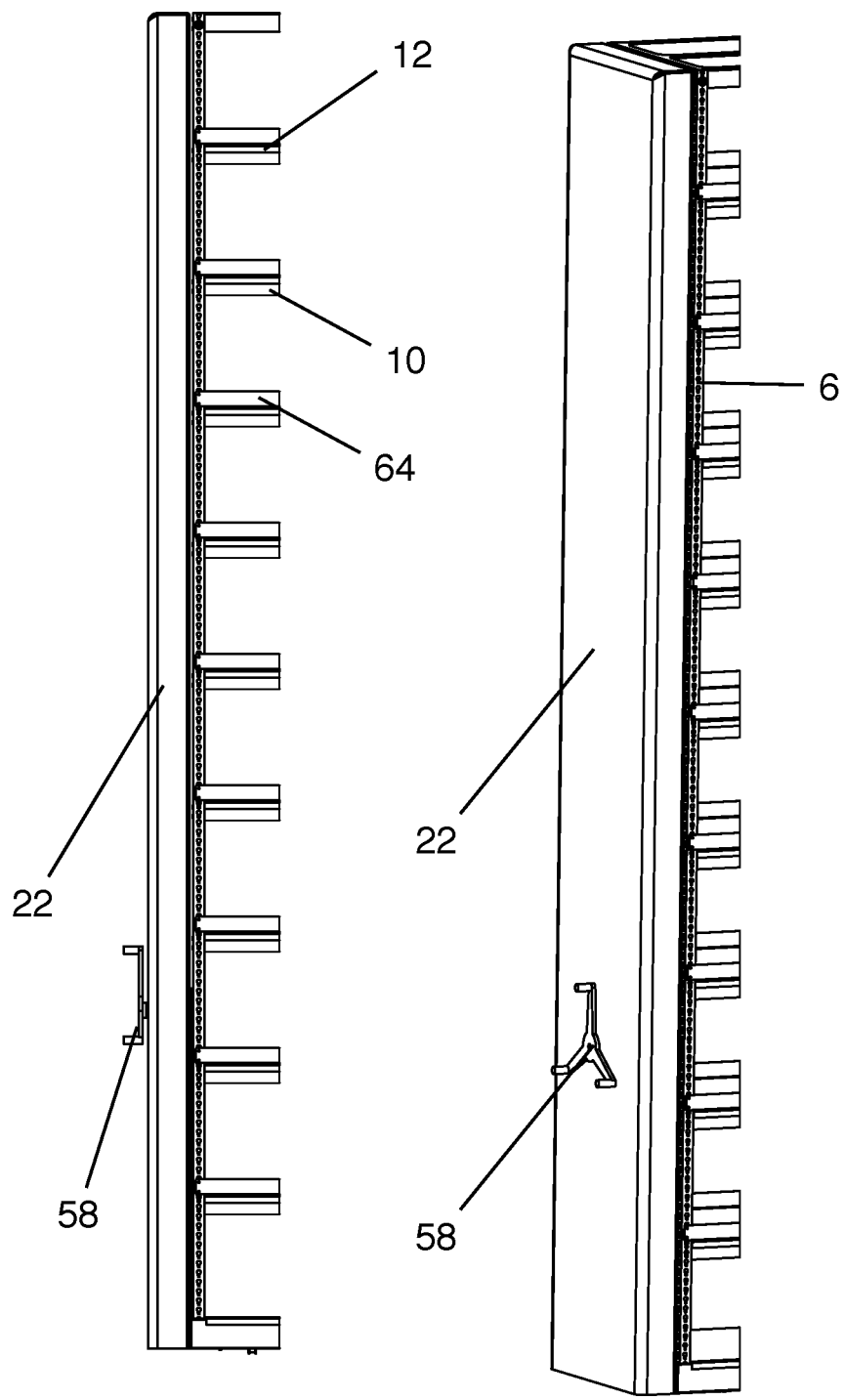
Figure 17F:
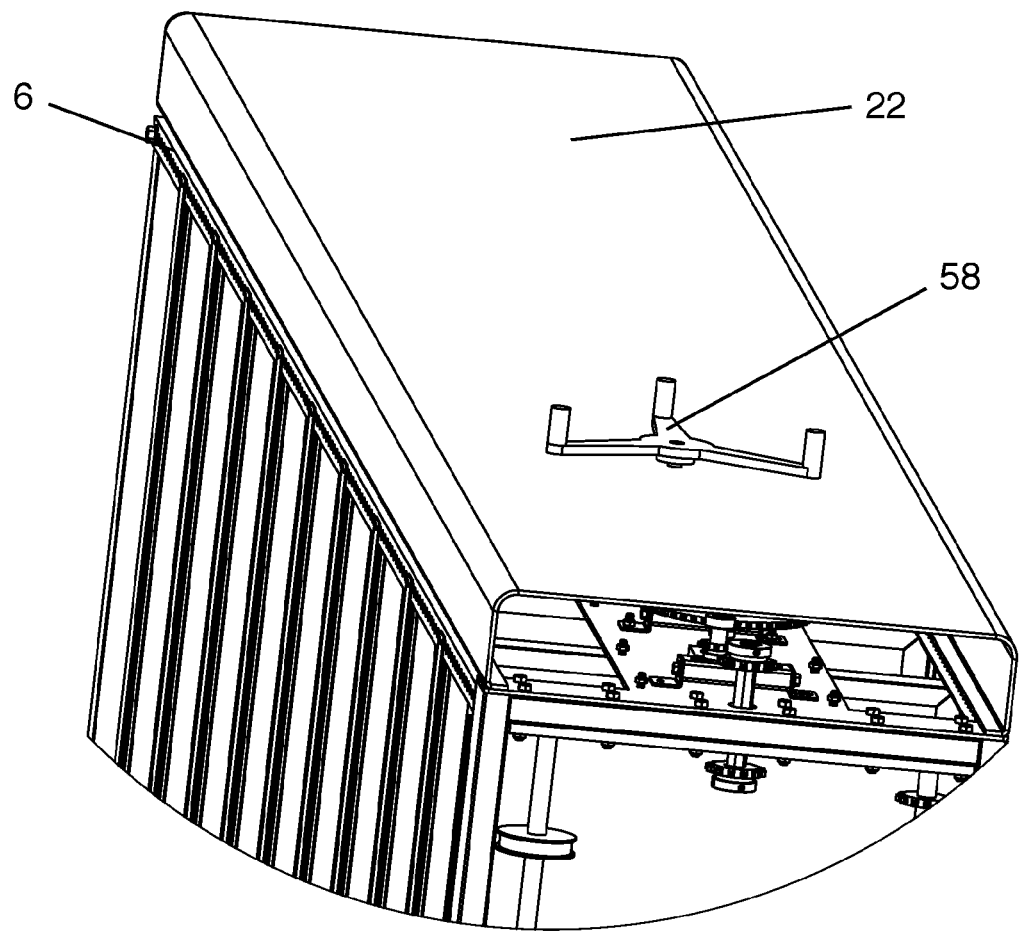
Figure 18A:
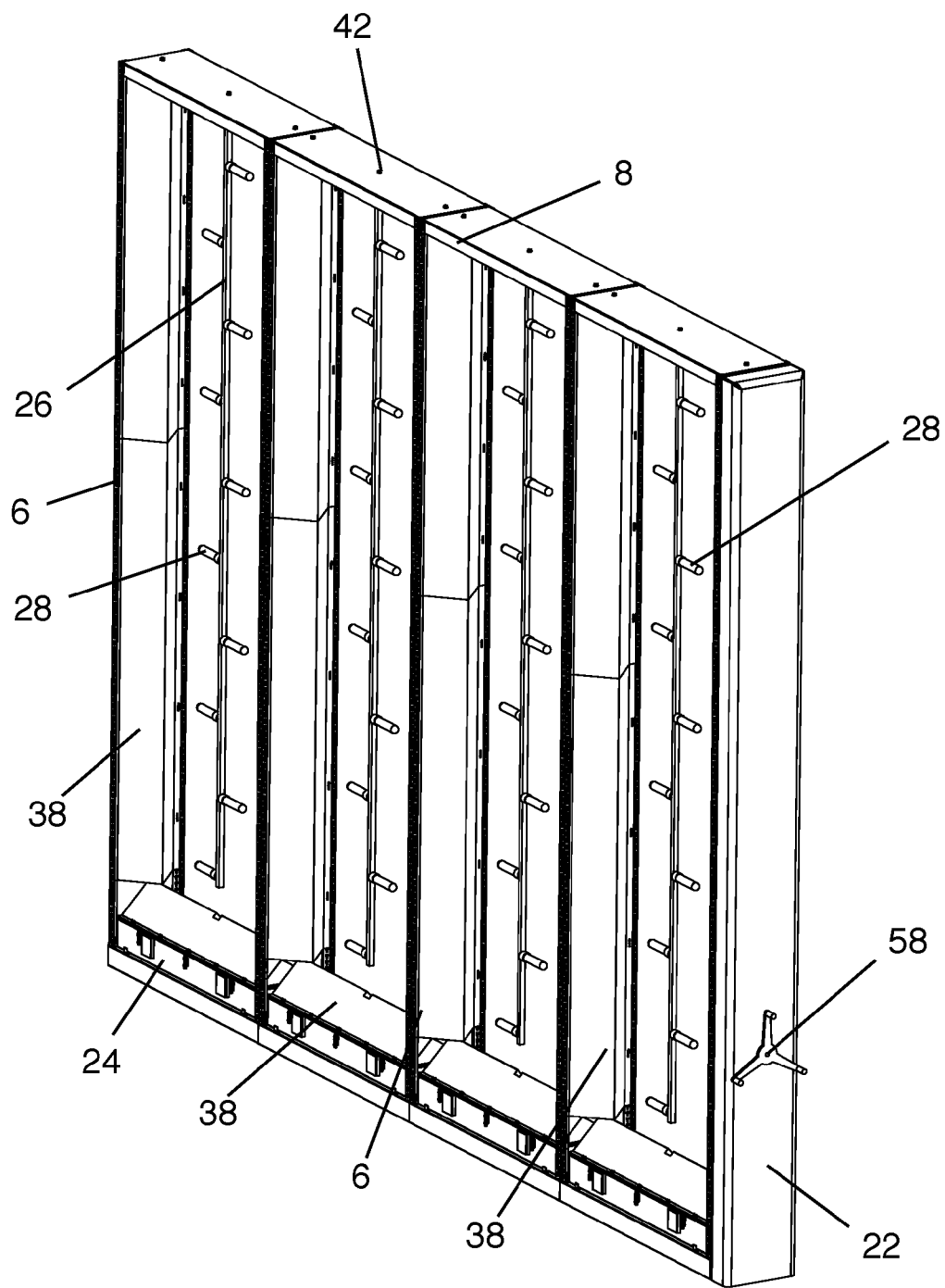
FIGS. 18A-F are perspective, top plan detail, top perspective detail, bottom perspective detail, side detail, and side perspective detail views, respectively, of a light wall of a vertical cultivation system consistent with the present disclosure, which further illustrate ornamental design elements.
Figure 18B:
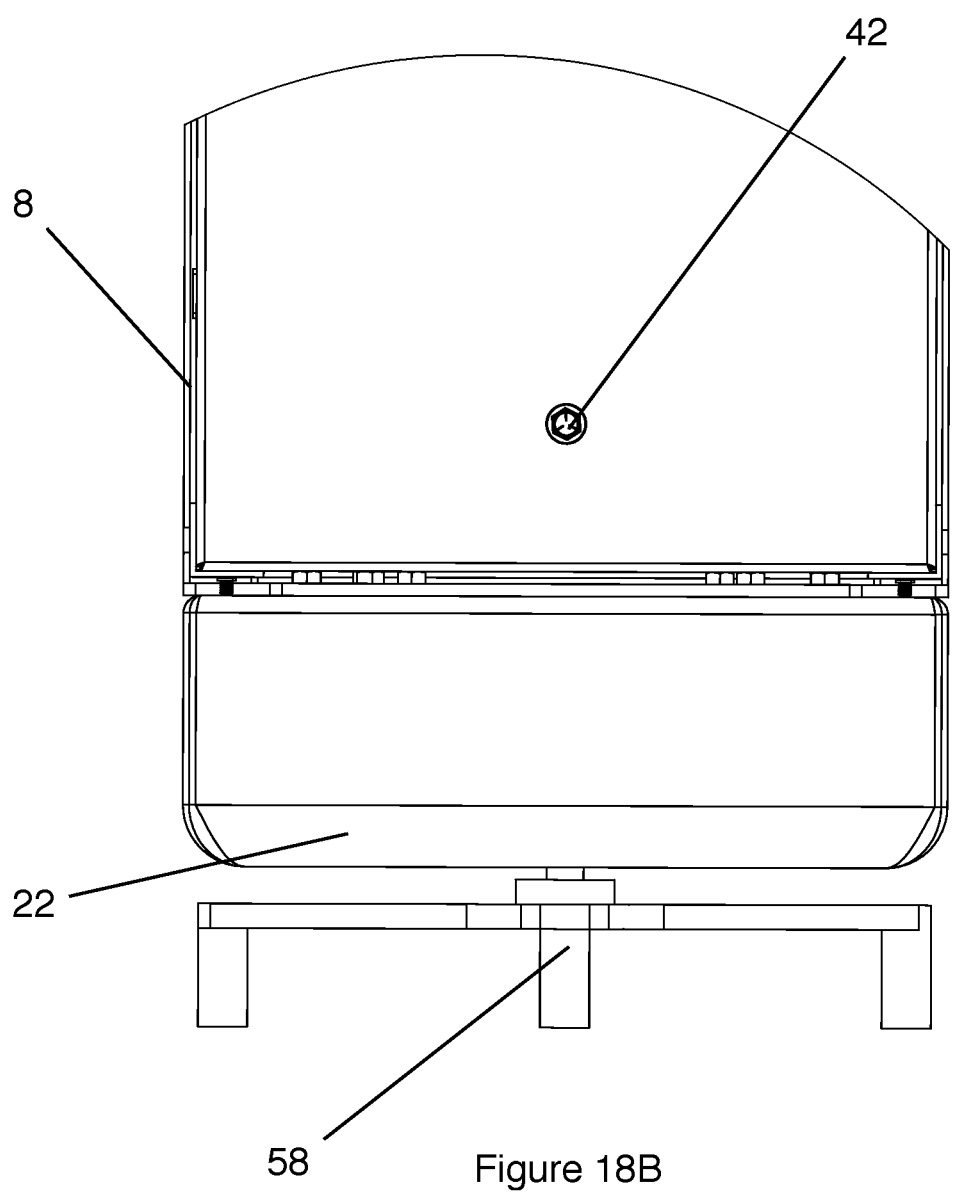
Figure 18C:
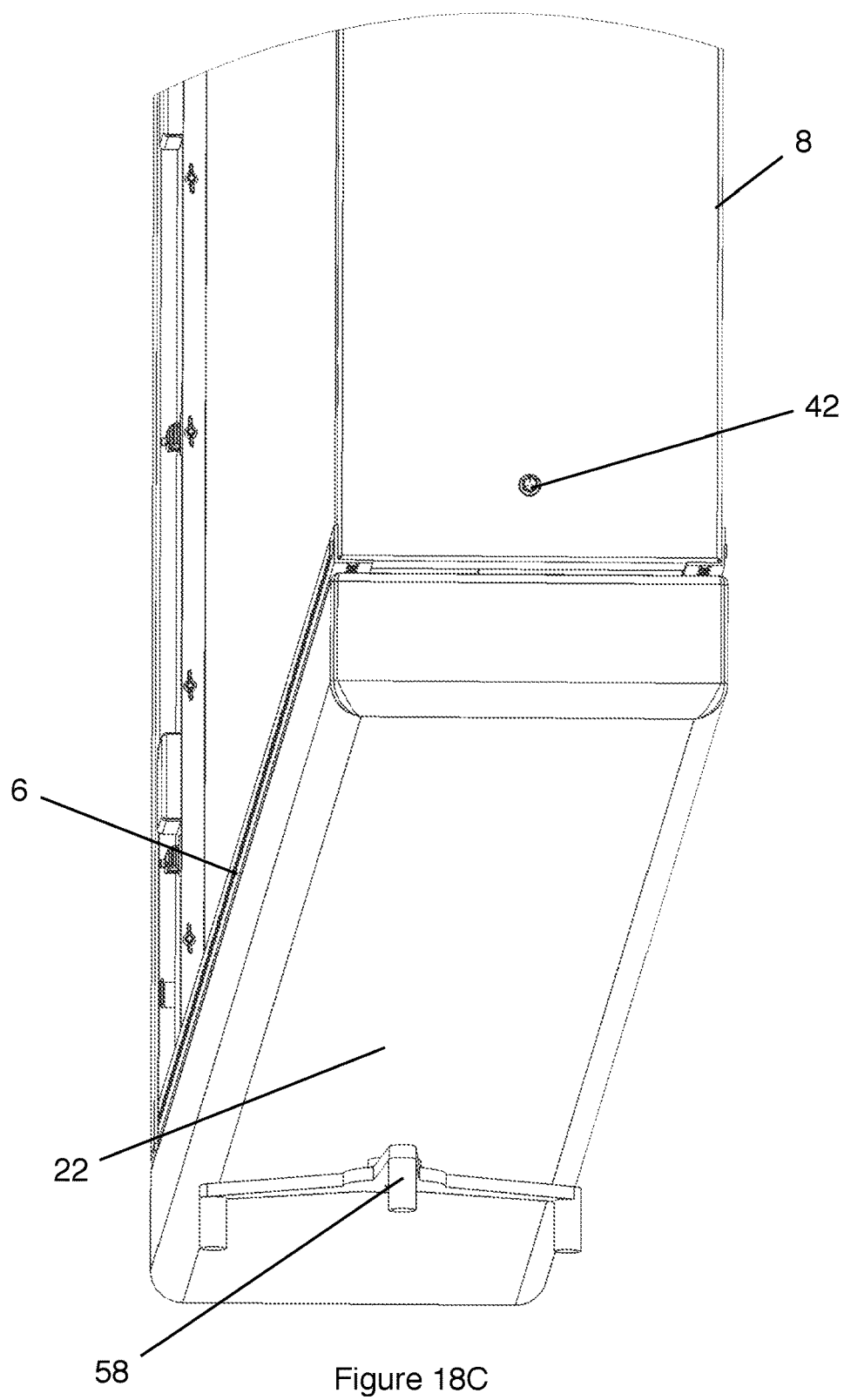
Figure 18D:
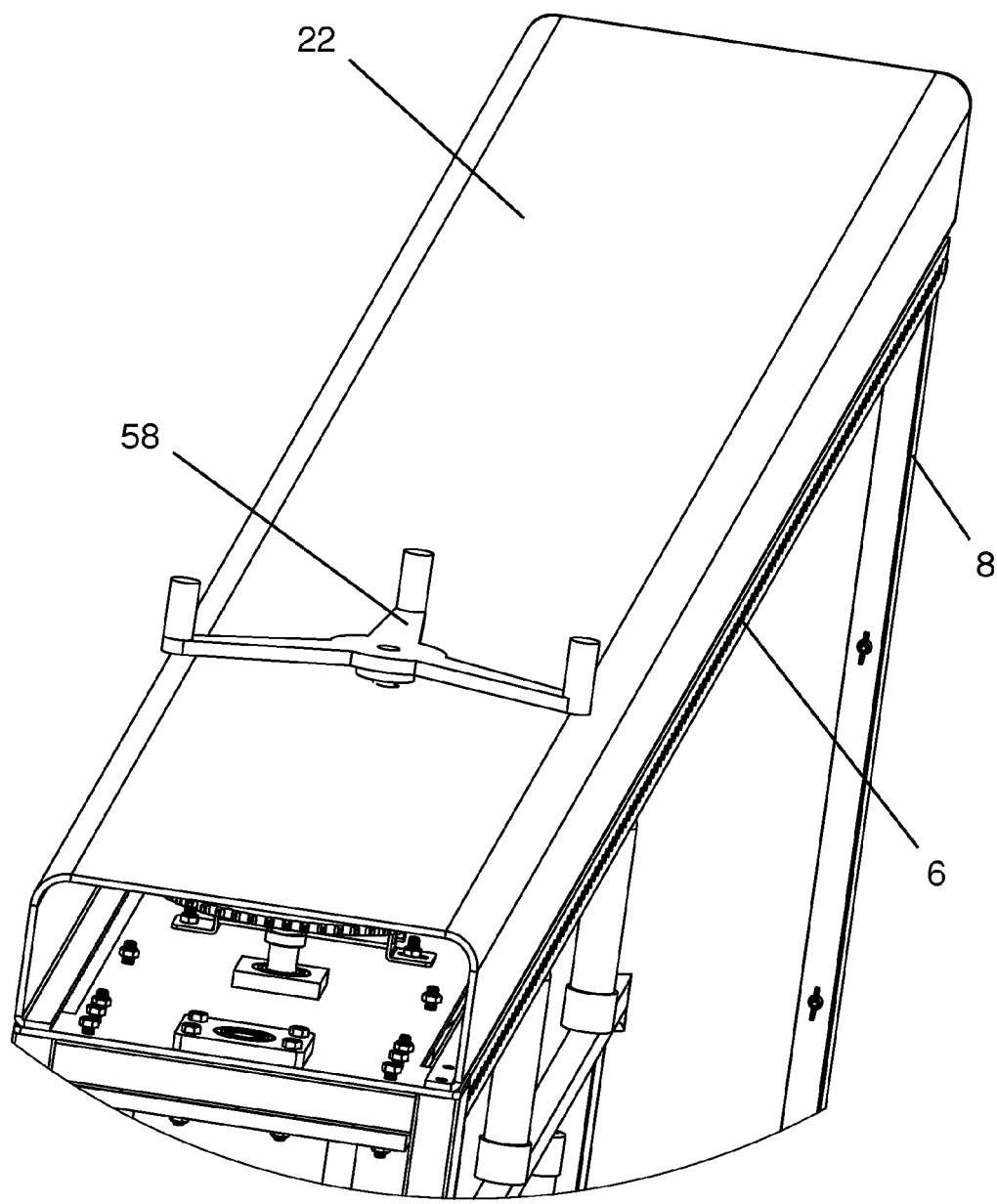
Figures 18E, 18F:
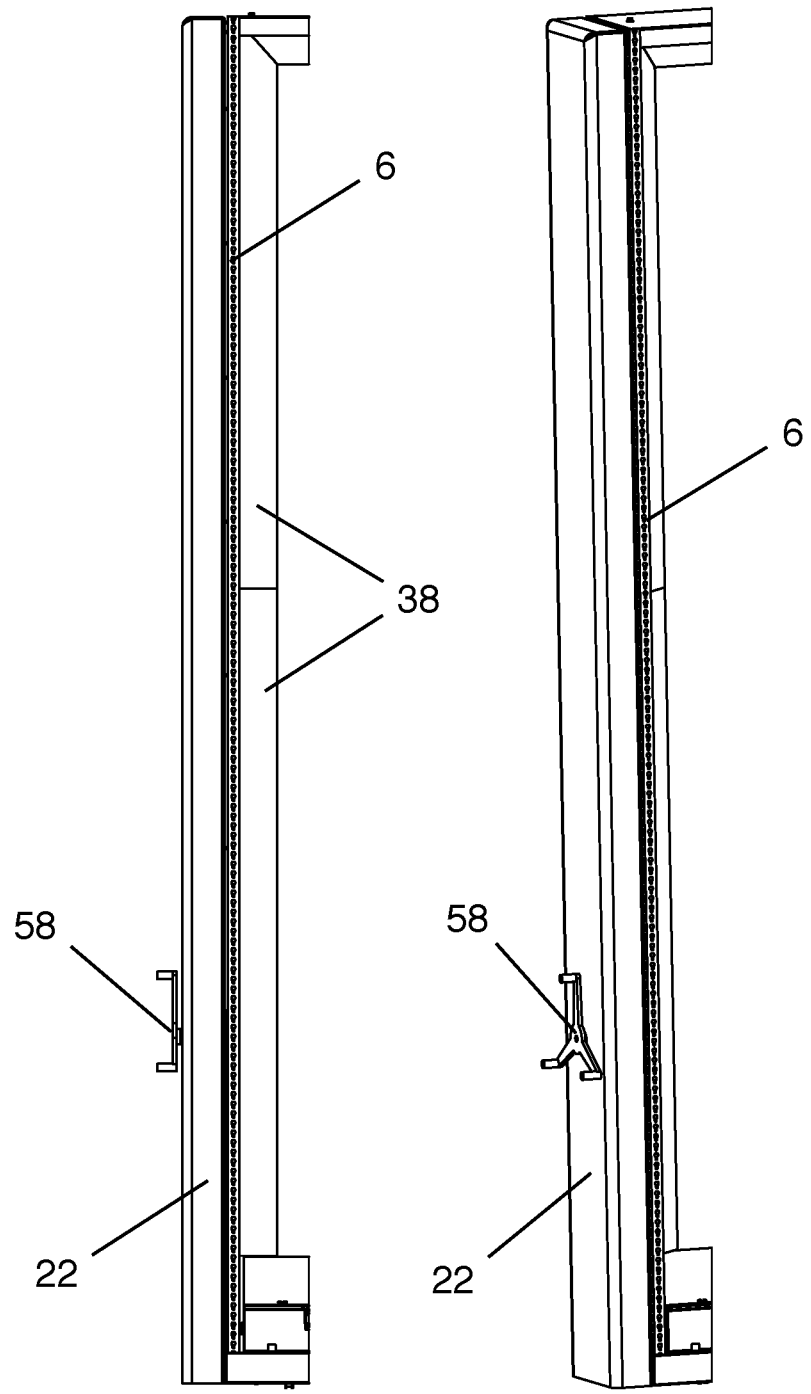
Figure 19:
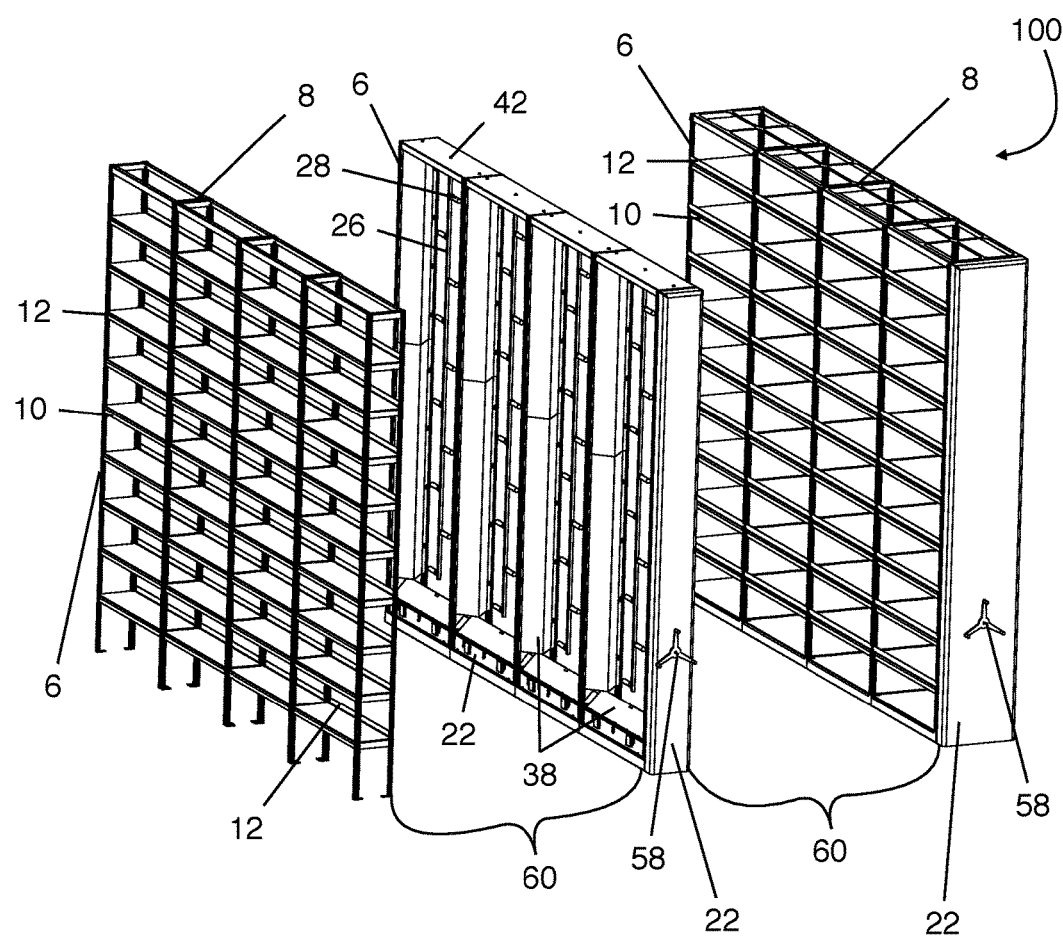
FIG. 19 is a perspective view of a portion of a vertical cultivation system consistent with the present disclosure, which further illustrates ornamental design elements.

FIGS. 14 and 15 are top and bottom perspective views, respectively, of another embodiment of light wall 120. This light wall 120 embodiment may include reflectors 38 on both interior sides, the interior of the top and bottom. Such reflectors 38 may be attached to horizontal support member 8 and vertical support member 6 by fasteners. In some embodiments, for example, as shown in FIGS. 14 and 15, reflectors 38 may substantially direct light to exit from a first side of light wall 120. Optionally in such embodiments (not shown) the second side of light wall 120 may be fitted with another reflector 38 to further direct light to exit from the first side of light wall 120. In other embodiments, for example as shown in FIG. 16, reflectors 38 may direct light to exit from both sides of light wall 120.

With reference to FIGS. 14 and 15, a light wall 120 embodiment may also include a light column 26 disposed on upper horizontal support member 8. The light column may be configured to support one light fixture 30 and one light source 28, or such elements may be combined. A wiring hole 42 may be located, for example, on vertical support member 6. Light wall 120 include one or more transparent panes 44 (not shown).

As shown, light wall 120 may include wheels 23, such as caster wheels to facilitate movement. While it is contemplated that light wall 120 may operate in a track, it may be preferred to include swiveling caster wheels 23 so that its position within a residential cultivation setting may be easily adjusted in additional directions.

As depicted, light wall 120 may be relatively small to accommodate cultivation in the residential setting. For example, light wall 120 may extend in a horizontal direction (x) for approximately 15 inches, a depth direction (y) for approximately 54 inches, and a vertical direction (z) for approximately 4 feet. An alternative embodiment may extend in a horizontal direction (x) of approximately 15 inches, in a depth direction (y) of approximately 54 inches, and in a vertical direction (z) of approximately 6 feet. Herein, approximate dimensions contemplate variances of up to 15%. Such dimensions are relevant because a household ceilings are typically an average of 8 feet tall and because typical commercially available, after-market shelving has a standard height (vertical, z direction) of 4 feet.

FIG. 16 is a perspective view of a light wall 120 embodiment, which shares many aspects with single cultivation wall 110. However, in this embodiment light wall 120 additionally includes a light column 26 disposed on lower horizontal support member. In yet other embodiments, a light wall 120 may alternatively include one or more light columns 26 disposed on lower horizontal support member or on a vertical support member.

As depicted in FIGS. 17A-F, 18A-F, and 19, mobile carriages 22 of cultivating walls 110 and/or light walls 120 may extend along the entire front of the walls 110, 120. As depicted, such carriages 22 may be characterized by an ornamental design to improve the aesthetic appearance of each wall 110, 120 or the system 100 as a whole. In some embodiments the front of non-moving walls 110, 120 may include an ornamental design similar of depicted carriages 22.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of the claims that follow. The specification and drawings are accordingly to be regarded in an illustrative rather than restrictive sense.

We claim:

1. A light wall for cultivating at least one plant indoors, comprising:
    a first side, a second side, a top side, a bottom side, a front side, and a back side;
    a first lighting structure unit housed within a space defined by the sides of the light wall;
    a first set of mechanical devices configured to enable movement of the light wall;
    wherein:
        the first lighting structure unit is configured to provide light to the at least one plant through at least the first side;
        the first set of mechanical devices is configured to enable movement at least along an axis substantially perpendicular to the first side;
        the first side has a vertical dimension and a depth dimension;
        the front side has the vertical dimension and a horizontal dimension;
        the first lighting structure unit comprises a first light column and a first light source;
        the first light column is configured to physically support and provide power to the first light source;
        the first lighting structure unit further comprises a light mover disposed along the top side;
        the light mover is attached to the first light column; and
        the light mover is configured to move at least along an axis substantially perpendicular to the front side.

2. The light wall of claim 1, wherein the first set of mechanical devices comprises a set of wheels disposed on the bottom side.

3. The light wall of claim 2, wherein:
    the set of wheels are swiveling caster wheels; and
    the set of wheels is further configured to enable movement at least along an axis substantially perpendicular to the front side.

4. The light wall of claim 1, wherein the first lighting structure unit comprises a set of reflectors configured to substantially direct light out of the first side.

5. The light wall of claim 1, wherein the first lighting structure unit comprises a set of reflectors configured to direct light out of the first side and the second side.

6. The light wall of claim 1, further comprising a transparent pane disposed along the first side.

7. The light wall of claim 6, further comprising a hinge between an edge of the transparent pane and an edge of one of the top side, the bottom side, the front side, and the back side.

8. The light wall of claim 1, wherein:
the vertical dimension is within 15% of 4 feet;
the depth dimension is within 15% of 54 inches; and
the horizontal dimension is within 15% of 15 inches.

9. The light wall of claim 1, wherein:
the vertical dimension is within 15% of 6 feet;
the depth dimension is within 15% of 54 inches; and
the horizontal dimension is within 15% of 15 inches.

10. The light wall of claim 1, wherein:
the first lighting structure unit further comprises a second light column and a second light source; and
the second light column is configured to physically support and provide power to the second light source.

11. The light wall of claim 10, wherein the first light column is disposed along the top side and the second light column is disposed along the bottom side.

12. The light wall of claim 1, wherein:
the first lighting structure unit further comprises a second light source; and
the first light column is configured to physically support and provide power to the second light source.

13. The light wall of claim 1, wherein the first light column is disposed along the top side.

14. The light wall of claim 1, further comprising a second lighting structure unit.

15. The light wall of claim 14, further comprising a third lighting structure unit.

16. The light wall of claim 1, further comprising a mobile carriage, wherein:
the mobile carriage is disposed at least on the bottom side; and
the first set of mechanical devices is disposed on a bottom surface of the mobile carriage.

17. A light wall for cultivating at least one plant indoors, comprising:
a first side, a second side, a top side, a bottom side, a front side, and a back side;
a first lighting structure unit housed within a space defined by the sides of the light wall;
a first set of mechanical devices configured to enable movement of the light wall;
wherein:
the first lighting structure unit is configured to provide light to the at least one plant through at least the first side;
the first set of mechanical devices is configured to enable movement at least along an axis substantially perpendicular to the first side;
the first side has a vertical dimension and a depth dimension;
the front side has the vertical dimension and a horizontal dimension;
the first set of mechanical devices comprises a first set of trolley wheels;
the first set of trolley wheels are disposed on the front side or the back side; and
the first set of trolley wheels are located closer to the top side than the bottom side.

18. The light wall of claim 17, wherein:
first lighting structure unit comprises a set of reflectors configured to direct light out of the first side and the second side.

19. The light wall of claim 17, wherein:
the first lighting structure unit further comprises a second light column and a second light source; and
the second light column is configured to physically support and provide power to the second light source.

20. A light wall for indoor plant cultivation, comprising:
a first side, a second side, a top side, a bottom side, a front side, and a back side; and
a first lighting structure unit housed within a space defined by the sides of the light wall;
wherein:
the first lighting structure unit includes a first light column with a first light fixture, a ballast box, and a set of reflectors;
the first light column is affixed to the bottom side;
the first light fixture is configured to receive a light bulb;
at least the first side and the second side permit the passage of light; and
the set of reflectors is configured to direct light out of the first side and the second side.

* * * * *